(12) United States Patent
Juda et al.

(10) Patent No.: US 8,539,067 B2
(45) Date of Patent: Sep. 17, 2013

(54) MULTI-CAMPAIGN CONTENT ALLOCATION BASED ON EXPERIMENT DIFFERENCE DATA

(75) Inventors: Adam I. Juda, New York, NY (US); Alexandra Baugher, San Francisco, CA (US); Michael M. Meyer, Seattle, WA (US); Pavan K. Desikan, Palo Alto, CA (US); Ilia Mirkin, New York, NY (US); Julie A. Black, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 427 days.

(21) Appl. No.: 12/777,554

(22) Filed: May 11, 2010

(65) Prior Publication Data

US 2011/0161407 A1 Jun. 30, 2011

Related U.S. Application Data

(60) Provisional application No. 61/291,503, filed on Dec. 31, 2009.

(51) Int. Cl.
*G06F 15/16* (2006.01)
*G06F 15/173* (2006.01)
*G06Q 30/00* (2012.01)

(52) U.S. Cl.
USPC ............ 709/224; 705/14.42; 705/14.43; 709/203

(58) Field of Classification Search
USPC ............ 709/203, 224; 705/14.42, 14.43
See application file for complete search history.

(56) References Cited

U.S. PATENT DOCUMENTS

| | | | | |
|---|---|---|---|---|
| 5,724,521 A * | 3/1998 | Dedrick | | 705/26.1 |
| 5,754,938 A * | 5/1998 | Herz et al. | | 725/116 |
| 5,848,396 A * | 12/1998 | Gerace | | 705/7.33 |
| 5,918,014 A * | 6/1999 | Robinson | | 709/219 |
| 6,006,265 A * | 12/1999 | Rangan et al. | | 709/226 |
| 6,009,409 A * | 12/1999 | Adler et al. | | 705/14.61 |
| 6,286,005 B1 * | 9/2001 | Cannon | | 705/14.66 |
| 6,460,036 B1 * | 10/2002 | Herz | | 707/748 |
| 6,567,786 B1 * | 5/2003 | Bibelnieks et al. | | 705/14.44 |
| 6,839,680 B1 * | 1/2005 | Liu et al. | | 705/7.33 |
| 7,031,932 B1 * | 4/2006 | Lipsky et al. | | 705/14.41 |
| 7,343,390 B2 * | 3/2008 | Cohen et al. | | 709/203 |
| 7,523,087 B1 * | 4/2009 | Agarwal et al. | | 705/7.29 |

(Continued)

OTHER PUBLICATIONS

Notification Concerning Transmittal of International Preliminary Report on Patentability; Nickitas-Etienne, Athina ; Jul. 12, 2012; World Intellectual Property Organization (WIPO) (International Bureau of); PCT/US2010/060046; 6 pages.

(Continued)

*Primary Examiner* — Kenny Lin
*Assistant Examiner* — Daniel C Murray
(74) *Attorney, Agent, or Firm* — Fish & Richardson P.C.

(57) ABSTRACT

Methods, systems, and apparatus, including computer programs encoded on a computer storage medium, for creating experiment content distribution campaigns ("experiment campaign") and allocating content in accordance with the experiment campaign. In one aspect, a control campaign or an experiment campaign are selected as an available campaign for providing content in response to receiving a content request. The selection can be a probability constrained selection where the probability with which the experiment campaign is selected is specified as a portion of a total number of requests received during an experiment period for which the experiment campaign is available to provide content. Content is provided in response to the request, where the provided content being content corresponding to the selected campaign.

21 Claims, 9 Drawing Sheets

(56) References Cited

U.S. PATENT DOCUMENTS

| | | | |
|---|---|---|---|
| 7,739,594 B2* | 6/2010 | Vasilik | 715/277 |
| 7,747,465 B2* | 6/2010 | Srinivasan et al. | 705/14.4 |
| 7,752,200 B2* | 7/2010 | Scholl et al. | 707/730 |
| 7,769,623 B2* | 8/2010 | Mittal et al. | 705/7.32 |
| 7,778,999 B1* | 8/2010 | Boisjolie et al. | 707/722 |
| 7,809,725 B1* | 10/2010 | Vasilik | 707/736 |
| 7,831,658 B2* | 11/2010 | Khopkar et al. | 709/203 |
| 7,844,894 B2* | 11/2010 | Khopkar et al. | 715/234 |
| 7,895,293 B1* | 2/2011 | Vasilik | 709/218 |
| 7,962,363 B2* | 6/2011 | Patel et al. | 705/14.4 |
| 8,239,489 B1* | 8/2012 | Vasilik | 709/218 |
| 8,249,912 B2* | 8/2012 | Elliott et al. | 705/7.29 |
| 8,255,458 B2* | 8/2012 | Cohen et al. | 709/203 |
| 2002/0078141 A1* | 6/2002 | Cohen et al. | 709/203 |
| 2002/0116481 A1* | 8/2002 | Lee | 709/220 |
| 2002/0143933 A1* | 10/2002 | Hind et al. | 709/224 |
| 2003/0037041 A1* | 2/2003 | Hertz | 707/1 |
| 2005/0171844 A1* | 8/2005 | Ferber et al. | 705/14 |
| 2005/0187823 A1* | 8/2005 | Howes | 705/14 |
| 2006/0173744 A1* | 8/2006 | Kandasamy et al. | 705/14 |
| 2007/0027901 A1* | 2/2007 | Chan et al. | 707/102 |
| 2007/0214048 A1* | 9/2007 | Chan et al. | 705/14 |
| 2008/0133365 A1 | 6/2008 | Sprecher et al. | |
| 2009/0012847 A1* | 1/2009 | Brooks et al. | 705/10 |
| 2009/0012848 A1* | 1/2009 | Brooks et al. | 705/10 |
| 2009/0063250 A1* | 3/2009 | Burgess et al. | 705/10 |
| 2009/0132346 A1* | 5/2009 | Duggal et al. | 705/10 |
| 2009/0157442 A1* | 6/2009 | Tesler | 705/7 |
| 2009/0281896 A1 | 11/2009 | Brooks | |
| 2012/0116868 A1* | 5/2012 | Chin et al. | 705/14.43 |

OTHER PUBLICATIONS

Notification of Transmittal of the International Search Report and the Written Opinion of the International Searching Authority, or the Declaration for PCT/US2010/060046 mailed Aug. 2, 2011, 9 pages.

Notification of Transmittal of the International Search Report and the Written Opinion of the International Searching Authority, or the Declaration for PCT/US2010/060024 mailed Aug. 2, 2011, 9 pages.

* cited by examiner

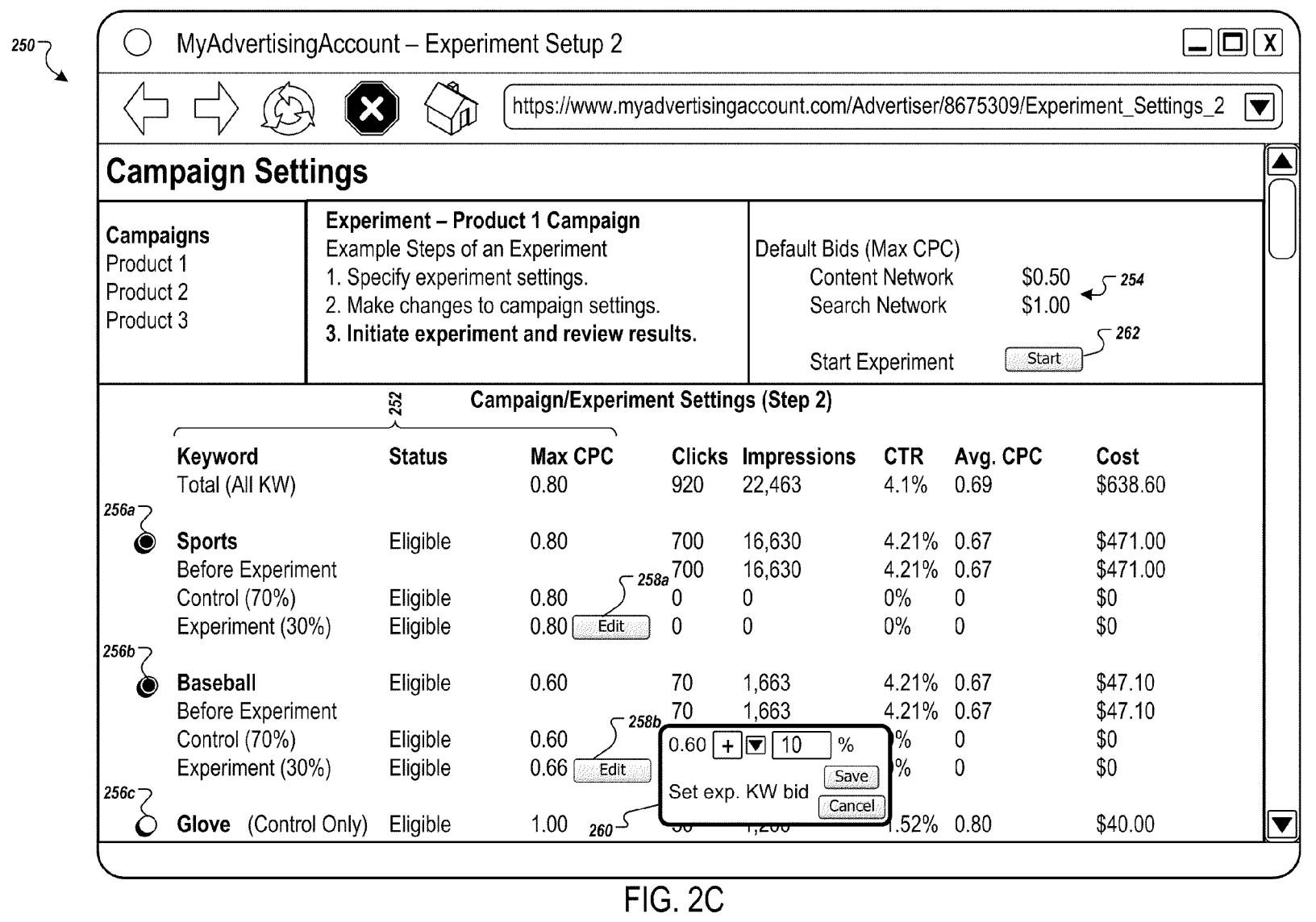

Campaign Settings

Experiment – Product 1 Campaign
Example Steps of an Experiment
1. Specify experiment settings.
2. Make changes to campaign settings.
3. Initiate experiment and review results.

Default Bids (Max CPC)
Content Network  $0.50
Search Network   $1.00

Start Experiment    [Start] — 254, 262

Campaign/Experiment Settings (Step 2) — 252

| Keyword | Status | Max CPC | Clicks | Impressions | CTR | Avg. CPC | Cost |
|---|---|---|---|---|---|---|---|
| Total (All KW) | | 0.80 | 920 | 22,463 | 4.1% | 0.69 | $638.60 |
| Sports | | | | | | | |
| Before Experiment | Eligible | 0.80 | 700 | 16,630 | 4.21% | 0.67 | $471.00 |
| Control (70%) | Eligible | 0.80 — 258a [Edit] | 700 | 16,630 | 4.21% | 0.67 | $471.00 |
| Experiment (30%) | Eligible | 0.80 | 0 | 0 | 0% | 0 | $0 |
| Baseball | | | | | | | |
| Before Experiment | Eligible | 0.60 | 70 | 1,663 | 4.21% | 0.67 | $47.10 |
| Control (70%) | Eligible | 0.60 — 258b [Edit] | 70 | 1,663 | 4.21% | 0.67 | $47.10 |
| Experiment (30%) | Eligible | 0.66 | | | 0% | 0 | $0 |
| Glove (Control Only) | Eligible | 1.00 | | | 1.52% | 0.80 | $40.00 |

256a, 256b, 256c

Set exp. KW bid: 0.60 [+][▶] 10 %   [Save] [Cancel] — 260

FIG. 2C

Campaign Settings

Experiment – Product 1 Campaign
Example Steps of an Experiment
1. Specify experiment settings.
2. Make changes to campaign settings.
3. Initiate experiment and review results.

Implement Experiment [Implement] — 288
Stop Experiment [Stop] — 284
Delete Experiment [Delete] — 286
Experiment Running Time – 2 weeks
Experiment Ends - Tomorrow

Campaigns
Product 1
Product 2
Product 3

Campaign/Experiment Results (Step 3) — 276

| Keyword | Status | Max CPC | Clicks | Impressions | CTR | Avg. CPC | Cost |
|---|---|---|---|---|---|---|---|
| Total (All KW) | | 0.80 | 2,450 | 62,079 | 3.95% | 0.53 | $1,303.78 |
| Sports | | | | | | | |
| Before Experiment | Eligible | 0.80 | 1,185 | 28,666 | 4.13% | 0.68 | $806.00 |
| Control (70%) | Eligible | 0.80 | 700 | 16,630 | 4.21% | 0.67 | $471.00 |
| Experiment (30%) | Eligible | 0.88 | 235 | 5,536 | 4.24% | 0.68 | $160.00 |
|  |  |  | 250 | 6,500 | 3.85% | 0.70 | $175.00 |
| Baseball | | | | | | | |
| Before Experiment | Eligible | 0.60 | 190 | 3,989 | 4.76% | 0.71 | $134.10 |
| Control (70%) | Eligible | 0.60 | 70 | 1,663 | 4.21% | 0.67 | $47.10 |
| Experiment (30%) | Eligible | 0.66 | 60 | 1200 | 5.00% | 0.70 | $42.00 |
|  |  |  | 60 | 1126 | 5.33% | 0.75 | $45.00 |

FIG. 2D

MULTI-CAMPAIGN CONTENT ALLOCATION BASED ON EXPERIMENT DIFFERENCE DATA

CROSS-REFERENCE TO RELATED APPLICATIONS

This application claims the benefit under 35 U.S.C. §119 (e) of U.S. Patent Application No. 61/291,503 entitled "Multi-Campaign Content Allocation," filed Dec. 31, 2009 which is incorporated herein by reference in its entirety.

BACKGROUND

This specification relates to content selection.

The Internet provides access to a wide variety of resources. For example, video and/or audio files, as well as web pages for particular subjects or particular news articles are accessible over the Internet. Access to these resources presents opportunities for advertisements to be provided with the resources. For example, a web page can include advertisement slots in which advertisements can be presented. These advertisements slots can be defined in the web page or defined for presentation with a web page, for example, in a pop-up window.

Advertisement slots can be allocated to advertisers through an auction. For example, advertisers can provide bids specifying amounts that the advertisers are respectively willing to pay for presentation of their advertisements. In turn, an auction can be performed and the advertisement slots can be allocated to advertisers according to their bids. When one advertisement slot is being allocated in the auction, the advertisement slot can be allocated to the advertiser that provided the highest bid. When multiple advertisement slots are allocated in a single auction, the advertisement slots can be allocated to set of bidders that provided the highest bids.

Advertisement management accounts can enable advertisers to track the performance of advertisements that are provided for the advertiser. For example, an advertiser can access the advertisement management account and view performance measures corresponding to the advertiser's advertisements. In turn, the advertiser can adjust settings that control the allocation of advertisements and compare the performance measures for the advertisements that are allocated using the new settings.

SUMMARY

In general, one innovative aspect of the subject matter described in this specification can be implemented in methods that include receiving a request to create an experiment campaign corresponding to a control campaign. The control campaign includes campaign parameters with which allocation of content corresponding to the control campaign is controlled. In response to the request, an initial experiment campaign having initial parameters that match a set of campaign parameters for the control campaign is created. The initial experiment campaign is modified based on received experiment parameters to create the experiment campaign that corresponds to the control campaign. The experiment parameters include data specifying an experiment period and a portion of content requests received during the experiment period for which the experiment campaign is available to provide content, and are used to adjust at least one parameter from the initial parameters. The experiment campaign is activated in response to a start condition, where activation of the experiment campaign causes the experiment campaign to be available, as specified by the experiment parameters, to provide content in response to content requests. The start condition specifies a condition that, upon detection, causes the experiment campaign to be activated. Performance measures are computed for the control campaign and the experiment campaign, where the performance measures are computed based on the content requests received during the experiment period. Data that causes presentation of the performance measures corresponding to the control campaign and the experiment campaign are provided. The provided data also causes presentation of variation identifiers that represent variations between performance measures for the control campaign and the experiment campaign that exceed a variation threshold. Other implementations of this aspect include corresponding systems, apparatus, and computer programs, configured to perform the actions of the methods, encoded on computer storage devices.

These and other implementations can each optionally include one or more of the following features. Methods can further include receiving, over the experiment period, a plurality of requests for content to be presented on a user device. For each of the requests an available campaign can be selected for providing content in response to the request, where the available campaign is selected from among the experiment campaign and the control campaign. The selection can be based on the outcome of a probability constrained selection function, where the probability constrained selection function can be a function that selects the experiment campaign as the available campaign with a first probability and selects the control campaign as the available campaign with a second probability. Using the selected campaign content is provided in response to the request, and performance measures are stored for the available campaign. Methods can also include computing the first probability and the second probability based on the portion of content requests received during the experiment period for which the experiment campaign is available to select content. Methods can further include storing, in response to receipt of the experiment parameters and in association with an experiment campaign identifier, experiment difference data specifying differences of the experiment parameters relative to the set of campaign parameters.

In some implementations, receiving experiment parameters can include receiving a percentage of all content requests received during the experiment period for which the experiment campaign is available to select content. Receiving experiment parameters that modify the initial campaign to create the experiment campaign that corresponds to the control campaign can include receiving a bid for the experiment campaign that differs from a corresponding bid for the control campaign. Receiving experiment parameters that modify the initial campaign to create the experiment campaign that corresponds to the control campaign can include receiving a targeting criterion for the experiment campaign that differs from existing targeting criteria for the control campaign. Activating an experiment campaign in response to a start condition can include activating the experiment campaign at a specified start time. Activating an experiment campaign in response to a start condition can include activating the experiment campaign in response to a user action requesting that the experiment campaign be activated.

In some implementations, computing performance measures for the control campaign and the experiment campaign can include computing an aggregate number of presentations of content corresponding to the experiment campaign; computing an aggregate number of presentations of content corresponding to the control campaign; computing an aggregate number of selections of content corresponding to the experiment campaign; and computing an aggregate number of selections of content corresponding to the experiment campaign. Computing performance measures can also include computing a variation between the performance measures for the control campaign and the performance measures for the experiment campaign; and determining that the computed variation exceeds the variation threshold. Determining that the computed variation exceeds a variation threshold can include determining that the computed variation is statistically relevant based on the computed variation relative to a number of data points used to compute the variation.

In general, another aspect of the subject matter described in this specification can be implemented in methods that include receiving a content request, where the request specifies one or more environment parameters corresponding to the environment for which the requested content is being requested. In response to the content request a content distribution account for which a control campaign and an experiment campaign are available is identified. The experiment campaign is associated with a set of campaign parameters corresponding to the control campaign and is also associated with experiment difference data specifying differences between the set of campaign parameters and experiment parameters corresponding to the experiment campaign. One of the control campaign and the experiment campaign is selected as an available campaign for the received content request. The selection can be a probability constrained selection where the probability with which the experiment campaign is selected is specified as a portion of a total number of requests received during an experiment period for which the experiment campaign is available to provide content. Content is provided in response to the request, the provided content being content corresponding to the selected campaign. Other implementations of this aspect include corresponding systems, apparatus, and computer programs, configured to perform the actions of the methods, encoded on computer storage devices.

These and other implementations can each optionally include one or more of the following features. Methods can include updating performance measures for the available campaign corresponding to the provided content, the performance measures including a total number of presentations of the content and a total number of user selections of the content; and providing data that causes the updated performance measures to be presented on a presentation device. Providing data that causes the updated performance measures to be presented can include providing data that causes a total keyword performance to be provided for each keyword corresponding to the experiment campaign and the corresponding control campaign. Providing data that causes the updated performance measures to be presented can also include providing data that causes presentation of delineated performance measures for at least one specified delineation of the experiment and control campaigns. Providing data that causes the updated performance measures to be presented can also include providing data that causes presentation of an updated experiment performance at a presentation location that is adjacent to an updated control performance.

Methods can also include selecting content to be provided in response to the request. The content can be selected based on the set of campaign parameters in response to selecting the control campaign as the available campaign. In response to the experiment campaign being selected as the available campaign, the content being selected can be selected based on the set of campaign parameters and the experiment difference data.

Particular implementations may realize one or more of the following advantages. For example, content can be selectively distributed according to different campaign parameters over a same time period so that performance results for the campaigns can be directly compared. Variation indicators can be presented to identify performance measures for an experiment campaign that have a statistically relevant variation relative to the performance measure for a corresponding control campaign to enable an advertiser to quickly identify campaign performance measures that are likely to significantly change in response to changes to parameters of the campaign. An advertiser is enabled to create an experiment campaign for an existing "control" campaign by specifying changes to the set of campaign parameters rather than specifying every parameter of the experiment campaign. The amount of data required to be stored for the experiment campaigns is reduced by storing experiment difference data representing the differences between the experiment campaign and the control campaign, rather than storing data representing all of the parameters for the experiment campaign.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 2A-2D are example screen shots of user interfaces that can be provided for creating and monitoring an experiment campaign.

Like reference numbers and designations in the various drawings indicate like elements.

DETAILED DESCRIPTION

Figure 1:
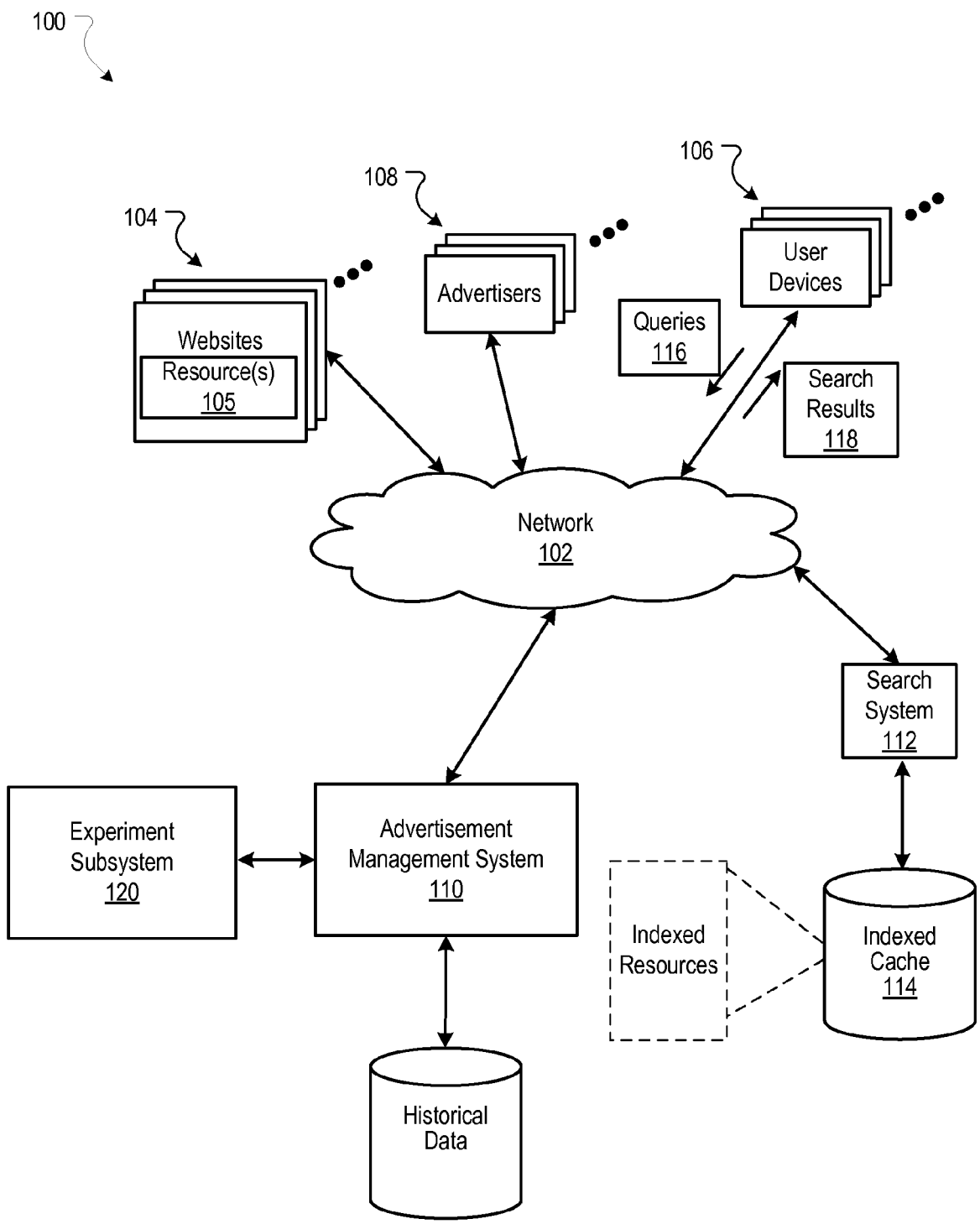
FIG. 1 is a block diagram of an example environment in which an advertisement management system manages advertising services.

When a user requests a web page (or another online resource), content requests (e.g., advertisement requests) can be initiated to request content for presentation on the user device for which the web page (or other online resource) was requested. The requested content can be, for example, text, images, audio, video or other content selected for presentation with the web page. In response to each content request received during an experiment period, content can be selectively allocated according to either a control campaign or an experiment campaign.

The control campaign is a campaign having a set of campaign parameters that have been specified by a content distributor for controlling distribution of content corresponding to the control campaign. In some implementations, the control campaign is required to have been created prior to a corresponding experiment campaign. In other implementations, the control campaign can be created concurrently with the experiment campaign. As described in more detail below, the control campaign can operate as a baseline campaign for determining how changes to the set of campaign parameters affect performance of content provided in response to the content requests.

The experiment campaign is a campaign having experiment parameters that control distribution of content corresponding to the experiment campaign. The set of campaign parameters for an experiment campaign generally includes at least one parameter that differs from the set of campaign parameters for the control campaign to which the experiment campaign corresponds. For example, an experiment campaign can include one or more targeting keywords that differ from or supplement those included in the set of campaign parameters for a corresponding control campaign. Any number of parameters of the experiment campaign can differ from the parameters for a corresponding control campaign.

The control campaign and the experiment campaign can each be available for providing content during the experiment period, and one of the campaigns will be selected as the available campaign for each particular content request (i.e., available to provide content in response to the particular content request). In some implementations, the selection of the control campaign or experiment campaign is a pseudo-random selection that can be subject to a probability constraint. For example, the probability constraint can require the experiment campaign to be selected with a specified probability and the control campaign to be selected with another specified probability. The specified probabilities for each of the campaigns can be equal or unequal. In other implementations, campaign selection can be performed in a non-pseudorandom manner, as described in more detail below.

Performance measures for the content allocated according to the control campaign and experiment campaign are computed, for example, based on a number of times that the content is provided in response to content requests as well as user interactions with the content when provided. The performance measures for the control campaign and the experiment campaign can be provided for presentation to the content distributor. In turn, the content distributor can compare the performance of the experiment campaign to the performance of the control campaign and implement the experiment campaign as a new control campaign, adjust the experiment campaign, or delete the experiment campaign.

Creation of experiment campaigns and allocation of content according to experiment and control campaigns is described throughout this document with reference to distribution of online advertisements in response to advertisement requests. The systems, apparatus, and processes described throughout this document can be implemented to distribute other content in response to other content requests. Additionally, the description that follows describes the advertisements being provided by an experiment subsystem that is implemented as an element of an advertisement management system. However, the experiment subsystem can be implemented as an independent system that communicates directly, or over a network, with the advertisement management system or another data processing apparatus.

FIG. 1 is a block diagram of an example environment 100 in which an advertisement management system 110 manages advertising services. The example environment 100 includes a network 102, such as a local area network (LAN), a wide area network (WAN), the Internet, or a combination thereof. The network 102 connects websites 104, user devices 106, advertisers 108, and the advertisement management system 110. The example environment 100 may include many thousands of websites 104, user devices 106, and advertisers 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as JavaScript scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display (e.g., a presentation location of a pop-up window or in a slot of a web page) in which advertisements can be presented. These specified portions of the resource or user display are referred to as advertisement slots.

To facilitate searching of these resources, the environment can include a search system 112 that identifies the resources by crawling and indexing the resources provided by the publishers on the websites 104. Data about the resources can be indexed based on the resource to which the data corresponds. The indexed and, optionally, cached copies of the resources are stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. An example search result 118 can include a web page title, a snippet of text or a portion of an image extracted from the web page, and the URL of the web page. Search results pages can also include one or more advertisement slots in which advertisements can be presented.

When a resource 105 or search results 118 are requested by a user device 106, the advertisement management system 110 receives a request for advertisements to be provided with the resource 105 or search results 118. The request for advertisements can include characteristics of the advertisement slots that are defined for the requested resource or search results page, and can be provided to the advertisement management system 110.

For example, a reference (e.g., URL) to the resource for which the advertisement slot is defined, a size of the advertisement slot, and/or media types that are available for presentation in the advertisement slot can be provided to the advertisement management system 110. Similarly, keywords associated with a requested resource ("resource keywords") or a search query 116 for which search results are requested can also be provided to the advertisement management system 110 to facilitate identification of advertisements that are relevant to the resource or search query 116.

Based on data included in the request for advertisements, the advertisement management system 110 can select advertisements that are eligible to be provided in response to the request ("eligible advertisements"). For example, eligible advertisements can include advertisements having characteristics matching the characteristics of advertisement slots and that are identified as relevant to specified resource keywords or search queries 116. In some implementations, advertisements having targeting keywords that match the resource keywords or the search query 116 are selected as eligible advertisements by the advertisement management system 110.

A targeting keyword can match a resource keyword or a search query 116 by having the same textual content ("text") as the resource keyword or search query 116. For example, an advertisement associated with the targeting keyword "hockey" can be an eligible advertisement for an advertisement request including the resource keyword "hockey." Similarly, the advertisement can be selected as an eligible advertisement for an advertisement request including the search query "hockey."

A targeting keyword can also match a resource keyword or a search query 116 by having text that is identified as being relevant to a targeting keyword or search query 116 despite having different text than the targeting keyword. For example, an advertisement having the targeting keyword "hockey" may also be selected as an eligible advertisement for an advertisement request including a resource keyword or search query for "sports" because hockey is a type of sport, and therefore, is likely to be relevant to the term "sports."

The advertisement management system 110 can select the eligible advertisements that are provided for presentation in advertisement slots of a resource or search results page based on results of an auction. For example, the advertisement management system 110 can receive bids from advertisers and allocate the advertisement slots to the highest bidders at the conclusion of the auction. The bids are amounts that the advertisers are willing to pay for presentation (or selection) of their advertisement with a resource or search results page. For example, a bid can specify an amount that an advertiser is willing to pay for each 1000 impressions (i.e., presentations) of the advertisement, referred to as a CPM bid. Alternatively, the bid can specify an amount that the advertiser is willing to pay for a selection (i.e., a click-through) of the advertisement or a "conversion" following selection of the advertisement. The highest bidders can be determined based on the bids alone, or based on the bids of each bidder being multiplied by one or more factors, such as quality scores derived from advertisement performance, landing page scores, and the like.

Advertisers can also specify budgets for their advertisement campaigns. A budget is a specified amount that an advertiser is willing to pay for distribution of content over a specified budget period. The specified period can be, for example, a specified time (e.g., one day, one week, or one year), a specified number of events (e.g., a number of impressions or clicks), or some other delineation of time or events. Once the amount the advertiser is charged for distribution of content during the budget period matches or exceeds the budget amount, the campaign can be prevented from providing content for the remainder of the budget period unless the advertiser increases or overrides its specified budget.

A conversion occurs when a user performs a particular action related to an advertisement provided with a resource or search results page. What constitutes a conversion may vary from case to case and can be determined in a variety of ways. For example, a conversion may occur when a user clicks on an advertisement, is referred to a web page, and consummates a purchase there before leaving that web page. A conversion can also be defined by an advertiser to be any measurable/observable user action such as, for example, downloading a white paper, navigating to at least a given depth of a website, viewing at least a certain number of web pages, spending at least a predetermined amount of time on a website or web page, or registering on a website. Other actions that constitute a conversion can also be used.

Advertisers may attempt to increase the performance of their advertisements by changing campaign parameters. An advertiser may specify different and/or additional targeting keywords (relative to those in the control campaign) that can be used to target the advertisement for presentation in response to a request for advertisements that specifies different and/or additional search queries 116 or resource keywords. Similarly, an advertiser may change a bid associated with an advertisement or targeting keyword to determine the effect of the change on performance of the advertisement. For example, the advertiser can monitor changes in performance of the advertisement after making changes to campaign parameters used to select advertisements for presentation to determine the effect of the changes.

Campaign parameters are parameters corresponding to a content distribution campaign that are used to control content selection in response to content requests. For example, campaign parameters can include targeting keywords and corresponding bids, geographic or demographic targeting criteria, as well as other parameters corresponding to a set of advertisements. A campaign is a set of one or more advertisements and corresponding campaign parameters that are grouped together into a same advertising unit. For example, advertisements for sporting equipment can be grouped together into a campaign.

Within a campaign, subsets of the advertisements can be grouped into "ad groups." For example, an ad group in the above-referenced sports equipment campaign can include a set of advertisements that are each directed to baseball equipment. The campaign parameters corresponding to each ad group can be referred to as ad group parameters and, because ad group parameters are a subset of campaign parameters, changes to ad group parameters constitute changes to campaign parameters.

While an advertiser can make changes to campaign parameters for a particular campaign and monitor changes to performance measures for its campaigns (and/or ad groups or individual advertisements), the original campaign parameters are no longer used for selection of advertisements in response to advertisement requests. Therefore, it can be difficult for an advertiser to ensure that changes in performance measures are due to the changes in the campaign parameters because an increase (or decrease) in campaign performance can occur for many different reasons. For example, the number of impressions received by a campaign can increase as a result of overall increased traffic that may occur on a seasonal basis (e.g., near a holiday, such as Valentine's Day). Additionally, the number of impressions can increase as a result of an increase in a number of search queries for a particular topic or event. For example, when baseball teams that will play in the World Series have been determined, search queries related to these teams may increase. Therefore, performance measures for advertisements targeted to these search queries may also increase due to the increased volume of search queries.

Changes in campaign performance that are caused by factors other than adjustments to campaign parameters can be accounted for by interchangeably and/or selectively providing content for either the experiment campaign or the control campaign over a specified period. Interchangeably providing content for the campaigns facilitates direct comparison of the performance of content provided for the experiment campaign and the control campaign because content being provided for the campaigns are provided over a common time period. Accordingly, external factors that affect content performance will be similar for both campaigns.

The advertisement management system includes an experiment subsystem 120 to facilitate the creation of an experiment campaign and allocate content for the experiment campaign and a corresponding control campaign over an experiment period. For example, the experiment subsystem 120 enables an advertiser to create an experiment campaign that controls allocation of advertisements in the campaign using adjusted campaign parameters for an existing campaign. These adjusted campaign parameters are referred to as experiment parameters. Additionally, the experiment subsystem 120 maintains the existing campaign ("control campaign") such that, once the experiment campaign is activated, advertisements can be selected for presentation over a specified time according to the experiment campaign and the control campaign. Therefore, the performance of the experiment campaign can be monitored over the experiment period and directly compared to the performance of the control campaign over the same experiment period. Accordingly, differences in performance measures for the experiment campaign and control campaign are more likely caused by differences between the control campaign and the experiment campaign than factors external to the campaigns (e.g., overall increased traffic).

Creation and monitoring of an example experiment campaign and example user interfaces that can be used to create the example experiment campaign are described below with reference to FIGS. 2A-2D. An example process by which an experiment campaign can be created and by which performance results for the experiment campaign are provided is described with reference to FIG. 3. Then, with reference to FIG. 4, an example process is described for providing advertisements using the control campaign and the experiment campaign, as well as updating performance measures for each of the campaigns. Creation of experiment difference data that can be used to represent differences between an experiment campaign and a corresponding control campaign is then described with reference to FIG. 5.

Various user interface elements are described below with reference to FIGS. 2A-2D. For example, text boxes and radio buttons are used as examples of user interface elements that can be used to receive user data input. These user interface elements are provided as examples of elements that can be implemented. Other user interface elements can be used (e.g., hypertext links, check boxes, and drop down menus).

FIGS. 2A-2D are example screen shots of user interfaces 200, 225, 250, and 275 that can be provided for creating and monitoring an experiment campaign. The user interfaces 200, 225, 250 and 275 can be provided, for example, by the advertisement management system 110 of FIG. 1. In some implementations, the advertisement management system 110 provides data that causes presentation of the user interfaces 200, 225, 250, and 275 on a user device from which a request for the user interface 200 is received.

An advertiser can initiate creation of an experiment campaign by selecting an "experiment" menu item 202 from user interface 200 that causes user interface 225 to be displayed. From user interface 225, the advertiser can enter general information about the experiment campaign such as a name identifying the experiment campaign and data specifying a start date and stop date for the experiment, as well as relative portions of the available advertisement requests for which the experiment and control campaigns are available campaigns. Once the advertiser has entered the general information about the experiment campaign, user interface 250 can be presented to the advertiser. Using user interface 250, the advertiser can make changes to the experiment parameters of the experiment campaign and activate the experiment campaign. The advertiser can then access the user interface 275 to review and/or monitor the performance measures for the control campaign and the experiment campaign.

Figure 2A:
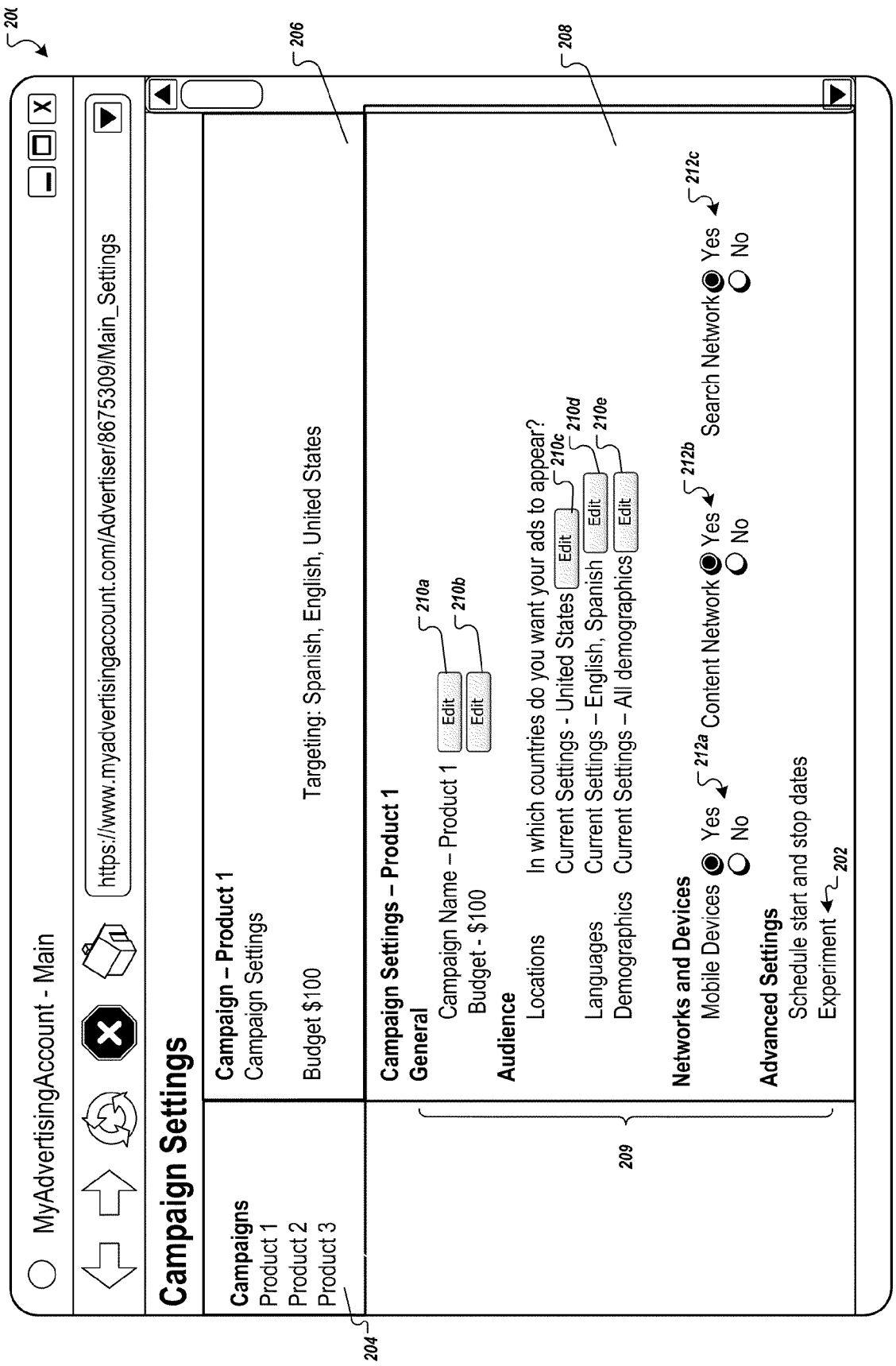

FIG. 2A is a screen shot of a user interface 200 that can be provided to an advertiser to assist the advertiser in managing its advertising account. The user interface includes an available campaign element 204 that lists campaigns that have been defined for the advertiser's account. As described above, each of the campaigns can have one or more associated advertisements and one or more defined ad groups. When the user interface 200 is first requested, data that causes presentation of details corresponding to a default campaign can be provided. In response to receiving data corresponding to selection of a campaign that is listed in the available campaign element 204, data can be provided that causes presentation of details corresponding to the selected campaign.

Details of the default or selected campaign can be provided in a campaign summary portion 206 in which general parameters of the campaign can be presented. For example, the name of the campaign, budget information, and targeting information are provided in the campaign summary portion 206.

The details of the default or selected campaign can also be provided in a campaign parameter adjustment portion 208. The campaign parameter adjustment portion 208 can include categories of campaign parameters 209 that can be adjusted. The campaign parameter adjustment portion 208 of user interface 200 includes "edit buttons" 210a-210e that, upon selection, enable an advertiser to adjust the campaign parameters. For example, the "Campaign Name" and "Budget" of the campaign can be respectively adjusted using buttons 210a and 210b. Similarly, targeting criteria for the campaign (e.g., locations, languages, and demographics) can be respectively adjusted using the buttons 210c-210e. Thus, to add or change the country or countries to which the campaign is targeted, the advertiser can select the button 210c and select or specify (e.g., in a text input box) the countries to which the campaign is being targeted.

The campaign parameter adjustment portion 208 also includes three pairs of "radio buttons" 212a-212c that can be selected to adjust the types of networks and devices to which the campaign is targeted. For example, selection of "Yes" from the pair of radio buttons 212a specifies that advertisements corresponding to the campaign can be presented in response to advertisements requests requesting advertisements to be provided to a mobile user device (e.g., cell phone, personal digital assistant, or other mobile device). Additionally, selections of "Yes" from the pairs of radio buttons 212b and 212c, respectively cause advertisements in the campaign to be available for presentation in a "content network" and a "search network."

A content network is a set of content resources (e.g., web pages, audio data, or video data) provided by resource publishers that have requested content (e.g., advertisements) be provided with their content resources. Content resources can include web pages that provide access to multimedia content and/or information directed to a particular topic. The content resources can also aggregate content from a number of other sources. For example, the publisher of a news website may register its website in the content network, thereby requesting advertisements that are eligible for presentation in the content network be provided for presentation with pages of its site. Similarly, publishers that provide audio, video, and gaming data can register their respective content resources in the content network. Content (e.g., advertisements) are provided for presentation with content resources in the content network based on topics to which the content resources are relevant (e.g., as represented by resource keywords) as well as geographic, demographic and other targeting criteria.

Content (e.g., advertisements) targeted to the search network is content that is eligible for presentation with search results pages that are provided in response to search queries. The content (e.g., advertisements) can be selected for presentation with search results pages based on the search query to which the search results page is responsive. For example, advertisements for which targeting keywords are matched by the search query corresponding to the search results page can be selected for presentation with the search results page. The content selected for presentation with search results pages can also be selected based on other targeting criteria, such as user profile information corresponding to the user for whom the search results page is being provided.

The campaign parameter adjustment portion 208 can also identify "advanced settings" options that, upon selection, cause presentation of additional campaign parameters that can be set or adjusted. For example, the campaign parameter adjustment portion 208 can include an "experiment" element 202 that, upon selection, causes presentation of experiment campaign parameters that can be set or adjusted to configure an experiment campaign. Thus, an advertiser who wants to configure an experiment campaign corresponding to a particular campaign can select the "experiment" element 202. In response to the selection of the experiment element 202, data that causes presentation of the user interface 225 can be provided to the user device from which the selection was received.

Figure 2B:
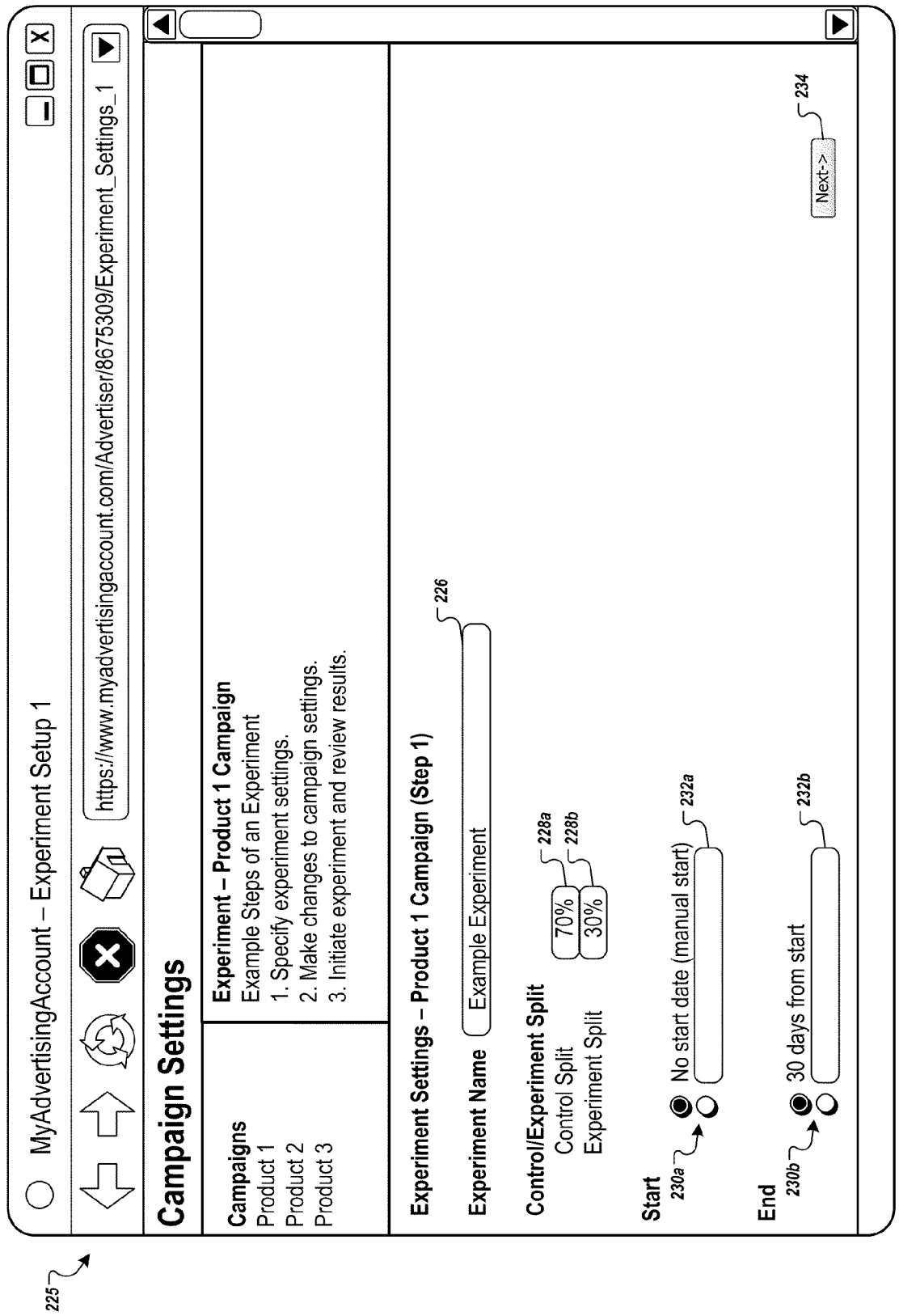

FIG. 2B is a screen shot of an example user interface 225 that can be provided to facilitate creation of an experiment campaign. The example user interface 225 can include, for example, a text box 226 that accepts text input specifying a name that is used to identify the experiment campaign. The example user interface 225 can also include text boxes 228a and 228b that respectively accept numerical input specifying a portion of advertisement requests for which the control campaign is to be made available for providing advertisements and a portion of the advertisement requests for which the experiment campaign is to be made available for providing advertisements. For example, a percentage of all advertisement requests for which the control campaign will be available (e.g., 70% of all advertisement requests) can be entered into the text box 228a. Similarly, the percentage of all advertisement requests for which the experiment campaign will be available (e.g., 30% of all advertisement requests) can be entered into the text box 228b. In some implementations, a sum of the percentages of advertisement requests for which each campaign is available equals 100%. The portion of all advertisement requests for which the experiment campaign is available to provide content is an experiment parameter for the experiment campaign. Experiment parameters are described in more detail with reference to FIG. 2C.

In some implementations, the portion of all advertisement requests for which the experiment campaign is available to provide content can be separately controlled for content requests corresponding to the search network and content requests corresponding to the content network. For example, assume that an experiment campaign has been enabled to provide content in response to content requests for the search network and the content network. In this example, if the advertiser specified that the experiment campaign is available to provide content for 30% of the content requests, the experiment subsystem 120 can separately track a number of content requests from each network for which the experiment campaign is made available to ensure that the experiment campaign is made available for 30% of the requests from the search network and 30% of the requests from the content network. Alternatively, the experiment subsystem 120 can be configured to ensure that the experiment campaign is allocated 30% of all content requests irrespective of the source (e.g., content network or search network).

In some implementations, the control campaign and experiment campaign can be independently enabled to provide content in response to content requests for one of the search network or the content network, or both networks. For example, an advertiser can specify that the control campaign is only available to provide content in response to content requests for the search network, while the experiment campaign is only available to provide content in response to content requests for the content network. Alternatively, the advertiser can specify that the control and experiment campaigns are available for both networks, or that the experiment campaign is available for both networks, while the control campaign is available for one of the networks. When an advertiser selects one or more networks for which each of the campaigns is enabled to provide content, data representing the networks for which each campaign is enabled can be received and stored as campaign parameters for the respective campaigns.

When an advertiser has specified a budget for its control campaign, and creates a corresponding experiment campaign, the budget can be divided between the control campaign and the experiment campaign. In some implementations, the budget is divided between the control campaign and the experiment campaign in proportion to the specified portion of the content requests for which each campaign will be available. Continuing with the example above, the experiment campaign can be allocated 30% of the initial budget, and the control campaign can be allocated 70% of the initial budget. In this example, each campaign is provided a portion of the budget that is equal to the portion of content requests for which the campaign will be available. However, the portion of the budget allocated to each campaign can be computed based on a function of the portion of content requests for which each campaign will be available and/or a function of other campaign parameters that differ between the campaigns. For example, the portion of the budget that is allocated to the campaign specifying a higher maximum bid for content allocation can be higher than that for the other campaign that specifies a lower maximum bid.

In some implementations, an advertiser can specify a portion of the budget that is allocated to the control campaign and the experiment campaign. For example, the advertiser can specify that the experiment campaign is allocated 20% of the available budget and that the control campaign is allocated 80% of the available budget. This budget allocation can be selected irrespective of the portion of content requests for which each campaign will be available. When the advertiser specifies a portion of the budget to be allocated to each of the campaigns, data representing the portion of the budget allocated to each of the campaigns can be received and stored as campaign parameters for the respective campaigns.

The example user interface can also include pairs of radio buttons 230a and 230b with which a manner of specifying start and stop dates for the experiment campaign can be selected. For example, when the radio button next to the "no start date" option is selected, a start date will not be associated with the experiment campaign. Rather, the experiment will start in response to user input (e.g., selection of a start option) that causes the experiment to start. However, when the radio button next to the text box 232a is selected, a start date for the experiment campaign can be entered into the text box 232a. When a start date is entered into the text box 232a, the campaign will start on the date entered in the text box 232a. A stop date for the campaign can similarly be set to be a default value (e.g., 30 days from start) by selecting the radio button next to the default value, or at a specified date by selecting the radio button next to the text entry box 232b and entering the stop date into the text box 232b. Alternatively, if no end date is specified, the experiment campaign can be active until manually stopped or another stop condition occurs.

The period defined by the start date and the stop date can be set as the experiment period, and is another experiment parameter for the experiment campaign. While the experiment period is referred to as a time period, the experiment period can be specified as a number of events (e.g., a number of received advertisement requests) or other conditions, the occurrence of which can be used to identify times at which the campaign experiment is to start and stop. Once general settings for the campaign have been entered, selection of the "next" button 234 can cause presentation of the user interface 250.

FIG. 2C is a screen shot of an example user interface 250 that can be provided to facilitate creation of an experiment campaign. The user interface 250 can include a set of campaign parameters 252 corresponding to the control campaign for which the experiment campaign is being created. For example, the campaign parameters presented in the user interface 250 can include keywords and corresponding bids that have been associated with the control campaign. As described in more detail below, the set of campaign parameters 252 corresponding to the control campaign can be used to create an experiment campaign.

The description that follows describes keywords and corresponding bids as campaign parameters that are included in a set of campaign parameters, but other campaign parameters can also be included in the set of campaign parameters and, in turn, can be used to create an experiment campaign. For example, demographic and psychographic campaign parameters can be included in the set of campaign parameters, as can advertising creatives (i.e., advertising images, copy, and/or animation) that are presented.

In some implementations, the same set of campaign parameters that are associated with the control campaign can be automatically associated with the experiment campaign as initial experiment parameters to create an initial experiment campaign. For example, if the keywords "sports," "baseball," and "glove" have been associated previously with the control campaign, then the keywords "sports," "baseball," and "glove" can be automatically associated with the experiment campaign. Additionally, any bids that have been individually associated with each of the keywords in the control campaign can be automatically associated with the same keywords in the experiment campaign. Alternatively, default bids 254 can be automatically associated with each keyword corresponding to the experiment campaign.

The default bids 254 are default values that an advertiser agrees to pay for presentation of (or user interaction with) its advertisements. The default bids can include a default content network bid and a default search network bid. The default content network bid is a default value that the advertiser will pay for presentation of (or user interaction with) its advertisement when presented with a content resource such as a web page, an audio or video file, an online game, or another content resource. The default search network bid is a default value that the advertiser will pay for presentation of (or user interaction with) its advertisement when presented with a search resource such as a search results page. The default bids can be specified by the advertiser and automatically applied to all new campaigns or separately specified for control campaigns and experiment campaigns.

Once the initial experiment campaign has been created, a final experiment campaign (referred to as the "experiment campaign") can be created by adjusting the set of campaign parameters that were used to create the initial experiment campaign. In some implementations, experiment parameters can be received from the advertiser through the user interface 250. The experiment parameters are data that define the parameters of the experiment campaign and are used to control allocation of content corresponding to the experiment campaign.

For example, as described above, the experiment parameters can include data specifying an experiment period over which the experiment campaign is available to provide content. The experiment parameters can also include data specifying a portion of all content requests that are received during the experiment period for which the experiment campaign is available to provide content. Additionally, the experiment parameters can include data specifying targeting keywords and corresponding bids that are used to determine whether content corresponding to the experiment campaign is to be provided in response to a content request.

In some implementations, the experiment parameters can be received from the advertiser in response to advertiser interaction with the user interface 250. For example, data can be provided that causes presentation of the set of campaign parameters and corresponding experiment parameters in the user interface 250, and the advertiser can adjust the experiment parameters through the user interface 250. For example, radio buttons 256a-256c can be provided next to keywords that are included in the set of campaign parameters for the control campaign to enable the advertiser to select which keywords are to be included in the experiment campaign.

When the set of campaign parameters for the control campaign are automatically associated with the experiment campaign, each of the radio buttons 256a-256c can be in a selected state. Therefore, the advertiser can selectively remove keywords from the experiment parameters for the experiment campaign by deselecting the radio button next to the keywords that the advertiser is removing. For example, in user interface 250, the radio button 256c has been deselected such that the keyword "glove" is no longer included in the experiment parameters or associated with the experiment campaign, and will only be used for providing content corresponding to the control campaign. However, radio buttons 256a and 256b are still selected such that the keywords "sports" and "baseball" are included in the set of experiment parameters and are used to provide content corresponding to the control campaign and the experiment campaign.

Experiment parameters can also be received from the advertiser that modify its bids that correspond to keywords that are included in the experiment campaign. For example, the user interface 250 can include "edit" buttons 258a and 258b that, upon selection, respectively enable the advertiser to modify the bids corresponding to the keywords "sports" and "baseball." For example, in response to selection of the "edit" button 258b, data can be provided to cause presentation of a bid adjustment element 260.

The bid adjustment element 260 can enable the advertiser to increase or decrease the bid corresponding to the keyword "baseball" for the experiment campaign, for example, relative to the current bid corresponding to the keyword "baseball" for the control campaign. For example, the advertiser can input a percentage amount by which the bid for the experiment campaign should be increased or decreased relative to the bid for the control campaign. Alternatively, the bid adjustment elements 260 can provide the advertiser the ability to directly input a bid amount for the experiment campaign, for example, through a text input box or from a drop-down menu.

The advertiser can continue to input data or otherwise specify other experiment parameters that will be used to control allocation of content corresponding to the experiment campaign. Upon receipt of the experiment parameters, the initial campaign is modified using the experiment parameters to create the experiment campaign, and data representing the experiment campaign is stored in a data store. In some implementations, experiment parameters that are stored for the experiment campaign can include all of the data that define the experiment campaign. For example, when the experiment campaign and control campaign each specify a same bid for a same keyword, the experiment parameters can include data corresponding to the same bid for the same keyword that is included in the set of campaign parameters.

In other implementations, and as described in more detail with reference to FIGS. 3 and 5, the experiment parameters that are stored for the experiment campaign can be limited to data specifying differences between the experiment campaign and the control campaign. Continuing with the example above, when the experiment campaign specifies the same bid for the same keyword as the control campaign, the stored experiment parameters may not include data corresponding to that bid for that keyword. Limiting the data corresponding to the experiment parameters that is stored reduces the amount of redundant data that is required to be stored due to the creation of experiment campaigns.

Once the advertiser has entered all of the experiment parameters, the advertiser can request that the experiment be activated, for example, through selection of a "start experiment" button 262. In response to selection of the "start experiment" button 262, data requesting activation of the experiment campaign can be received, for example, by the experiment subsystem 120 and/or the advertisement management system 110 of FIG. 1. In turn, the experiment subsystem 120 and/or the advertisement management system 110 can activate the experiment campaign upon detection of a start condition.

A start condition is a specified condition that, upon detection, causes the experiment campaign to be activated. When the experiment parameters include a start date (or data specifying another starting point) for the experiment campaign, the start condition can correspond to the specified start date (or other starting point) and be satisfied when a current date matches the start date. For example, if the start date for an experiment campaign is set to Jan. 1, 2010, then the start condition can be satisfied when the date is Jan. 1, 2010.

When the experiment parameters do not include a start date (or other data specifying a starting point) for the experiment campaign, the start condition can correspond to a specified user action. For example, the start condition can correspond to a selection of the "start experiment" button 262. In this example, when data representing selection of the "start experiment" button 262 is received, the advertisement management system 110 and/or the experiment subsystem 120 activates the experiment campaign. Additionally, the start condition can be based on performance measures for the control campaign. For example, the start condition can correspond to the control campaign receiving a specified number of impressions for over a specified period.

Once the experiment campaign has been activated, the control campaign and the experiment campaign are both available campaigns for providing content in response to content requests. Although the control campaign and the experiment campaign are both available campaigns, in some implementations, only one of the campaigns is available to provide content in response to a particular content request. For example, in response to receiving a particular content request, the experiment subsystem 120 selects either the experiment campaign or the control campaign as the available campaign for that particular content request. As described in more detail with reference to FIG. 4, the experiment subsystem 120 can select either the experiment campaign or the control campaign as the available campaign for each content request. In some implementations, the selection is pseudorandom, while in other implementations, the selection is non-pseudorandom.

Over the campaign period, the advertisement management system 110 and/or the experiment subsystem 120 can monitor performance measures for the control campaign in the experiment campaign. For example, the experiment subsystem 120 can compute an aggregate number of content requests for which the control campaign and the experiment campaign were each selected as the available campaign.

Additionally, the experiment subsystem 120 can compute an aggregate number of presentations of content corresponding to the experiment campaign and an aggregate number of presentations of content corresponding to the control campaign. For example, for each content request for which the experiment campaign was the available campaign, the experiment subsystem 120 can determine whether content corresponding to the experiment campaign was provided for presentation on a user device. Similarly, for each content request for which the control campaign was the available campaign, the experiment subsystem 120 can determine whether content corresponding to the control campaign was provided for presentation on a user device. In turn, the experiment subsystem 120 can compute the total number of presentations of content corresponding to each of the control campaign and the experiment campaign over the experiment period. This total number of presentations is referred to as a total number of impressions.

Further, the experiment subsystem 120 can compute an aggregate number of selections of content corresponding to the experiment campaign and an aggregate number of selections of content corresponding to the control campaign. For example, in response to user selection of content corresponding to either the experiment campaign or the control campaign, data representing the selection can be received by the experiment subsystem 120 and stored as a selection of the content for the corresponding campaign. At the end of the experiment period, the stored data representing selections of content for each of the campaigns can be analyzed to determine a total number of selections of content for each of the campaigns. This total number of selections of content for each campaign is referred to as a total number of clicks.

In some implementations, the experiment subsystem 120 and/or advertisement management system 110 can provide data that cause presentation of performance measures for the control campaign and the experiment campaign. FIG. 2D is a screen shot of an example user interface 275 that can be provided to report performance measures for an experiment campaign. The user interface 275 includes the campaign parameters and corresponding experiment parameters 252 for the control campaign and corresponding experiment campaign. The user interface 275 also includes data representing the performance measures 276 for the experiment campaign and the control campaign.

For example, the performance measures 276 that are provided by the user interface 275 include a total number of clicks that content corresponding to the campaigns have received, a total number of impressions that content corresponding to the campaigns have received, a click through rate for the content corresponding to the campaigns, an average cost per click for the content corresponding to the campaigns, and a total cost for providing content according to the parameters of the campaigns.

In some implementations, the performance measures 276 can include aggregate performance measures for both campaigns (e.g., control and experiment). For example, the aggregate performance measures for both campaigns can include a total number of impressions 278a and total number of clicks 278b for content provided by either campaign as well as a click through rate 278c and average cost per click 278d for content provided by either campaign and the total cost 278e for providing content by both campaigns 278e.

The performance measures 276 can also include delineated performance measures that provide performance measures for a specified delineation of the campaigns and can be provided for different levels of campaign aggregation (e.g., per keyword, per ad group, per campaign). For example, the delineated performance measures can provide performance measures for content provided in response to satisfaction of a particular keyword, irrespective of whether the content was provided prior to or during the experiment period, and irrespective of whether the content was provided by the control campaign or the experiment campaign. This delineated performance measure is referred to as a total keyword performance 280a. A total keyword performance can be provided for every keyword that is associated with the control campaign or the experiment campaign. In some implementations, the total keyword performance can be measured from a time at which the control campaign was created, or from some other specified time.

The delineated performance measures can also provide performance measures of content provided by the control campaign when the experiment campaign is not active (e.g., prior to creation of the experiment campaign and after the experiment period) and in response to satisfaction of a particular keyword. This delineated performance measure is referred to as a control keyword performance 280b. A control keyword performance can be provided for each keyword that is associated with the control campaign. The control keyword performance for a keyword can also be measured from a time at which the control campaign was created, or from some other specified time.

The delineated performance measures can also provide performance measures of content respectively provided over the experiment period by the control campaign and the experiment campaign. For example, a control performance 280c and an experiment performance 280d can be provided for each advertisement creative or other content corresponding to each keyword that is associated with the control campaign and the experiment campaign. When a keyword is associated with the experiment campaign, but not the control campaign, the total keyword performance and the corresponding experiment keyword performance may be equal because all of the performance for the keyword results from the experiment campaign.

In some implementations, multiple advertisement creatives are available to be provided when a particular targeting keyword (or other targeting criteria) is matched. In these implementations, the delineated performance measures can be further delineated to provide measures of performance for each individual advertisement creative that was provided.

In some implementations, a campaign parameter and corresponding experiment parameter as well as the control performance for the campaign parameter and corresponding experiment performance can be presented at adjacent presentation locations. Presenting (i.e., providing data that causes presentation of) the experiment performance measures and corresponding control performance measures at adjacent presentation locations enables an advertiser to easily compare the experiment performance measures for a particular experiment parameter to the control performance measures for the corresponding control parameter. Thus, the advertiser can directly compare the experiment and control performance measures to determine whether the experiment campaign or the control campaign provided higher performance over the experiment period.

The user interface 275 can also include variation identifiers 282a and 282b. The variation identifiers represent variations between performance measures for the control campaign and the experiment campaign that exceed a variation threshold. In some implementations, the variation threshold can be specified as a percent (or absolute) value difference between an experiment performance measure and its corresponding control performance measure. For example, the variation identifiers can specify that an increase or decrease in an experiment performance measure relative to the corresponding control performance measure is statistically relevant.

Statistical relevance can be determined as a function of the value difference between the experiment performance measure and the control performance measure relative to a number of data points with which the performance measures are computed. For example, assume that content provided for an experiment campaign based on satisfaction of a first keyword is selected 100 times and content provided based on satisfaction of a second keyword is selected 100,000 times. Also assume that the respective number of selections represents a 1.00% increase in selections relative to a total number of selections for the content for corresponding control campaigns.

In this example, the 1.00% increase for the second keyword may be statistically relevant, whereas the 1.00% increase for the first keyword may not be statistically relevant because, even though the number of selections for each keyword has increased by 1.00%, a 1.00% increase for the first keyword represents a much smaller absolute number of selections than the 1.00% increase in selections for the second keyword. The change in performance values that is considered statistically relevant can be determined on an advertiser-by-advertiser (or campaign-by-campaign) basis or set globally for all advertisers (or campaigns).

In some implementations, the variation identifiers 282a and 282b can be graphical elements that designate a relative magnitude of the performance change. For example, the graphical elements can be arrows that point up or down to respectively designate an increase or decrease in the experiment performance relative to the control performance. Other graphical elements (e.g., stars, checks, bar graphs, or other graphical elements) can also be used to communicate an increase or decrease in the experiment performance measure relative to the control performance measure.

The magnitude by which the experiment performance measure is higher or lower than the control performance measure can be designated by a number of elements that are presented. For example, the variation identifier 282a includes three arrows that point up, while the variation identifier 282b includes two arrows that point up. In this example, the variation identifier 282a indicates that a difference between the experiment click through rate for the keyword "baseball" relative to the control click through rate for the keyword "baseball" is more significant and/or higher than the difference between the experiment average cost per click for the keyword "baseball" and the control average cost per click for the keyword "baseball." Including variation identifiers 282 that provide an indication of the magnitude by which an experiment performance measure differs from the corresponding control performance measure enables an advertiser to quickly identify experiment parameters that provide larger performance measure changes than other experiment parameters.

In some implementations, the user interface 275 can also include a budget limited indicator that informs the advertiser whether the experiment campaign, control campaign or both campaigns were budget limited. The budget limited indicator can also include a date and/or time at which the campaign(s) was budget limited and/or a number of content requests received for the remainder of the budget period for which the campaign was not available to provide content because of the budget having been met.

Once an experiment campaign has been started, an advertiser can navigate to the user interface 275 to monitor the performances of the experiment campaign and corresponding control campaign, without having to wait until the experiment period has ended. For example, an advertiser can navigate to the user interface 275 and iteratively refresh the display (e.g., by submitting a new request for the display) to see updated performance measures. Alternatively, data can be iteratively provided to the user device to update the performance measures without requiring user action.

In some implementations, data can be received from an advertiser specifying performance thresholds and corresponding actions to be taken when the performance thresholds are violated. For example, an advertiser can specify that an experiment campaign be automatically stopped if the spend rate (i.e., an amount of money spent relative to a time over which the amount of money spent) exceeds a spend rate threshold. Similarly, an advertiser can request to receive an alert when a click-through-rate is lower than a click-through-rate threshold. Performance thresholds can be set for any performance measure of an experiment campaign and the thresholds can be specified as absolute values, or values relative to corresponding performance measure values for the control campaign. Performance thresholds can also be set for the control campaign. The alert can be provided to the advertiser, for example, in the user interface 275, in an e-mail, text message to a mobile device, or provided to the advertiser through other forms of communication.

At any point during the campaign or at the end of the campaign period, the advertiser can take action with respect to the campaign through the user interface 275. For example, the advertiser may elect to stop the experiment campaign, by selecting a "stop" button 284. In response to selection of the "stop" button 284, the experiment subsystem 120 receives data indicating that the experiment campaign is to be stopped. In turn, the experiment subsystem 120 can cause the experiment campaign to no longer be available for providing content in response to content requests. Thus, the control campaign can be made available for each received content request.

Once the experiment campaign has been stopped, either by selection of the stop experiment button 284, or the end of the experiment period being identified, the advertiser can elect to delete the experiment campaign by selecting the "delete" button 286. In response to selection of the "delete" button 286, the experiment subsystem 120 receives data indicating that the experiment campaign is to be deleted. In turn, the experiment subsystem 120 can cause the experiment parameters that have been stored for the experiment campaign to be deleted. Additionally, the delineated performance measures can be hidden or deleted.

The advertiser can also elect to implement the experiment campaign by selecting the "implement" button 288. The advertiser can select the "implement" button 288 at any point during the experiment period, at the end of the experiment period, or following selection of the "stop" button 284. In response to selection of the "implement" button 288, the experiment subsystem 120 receives data indicating that the experiment campaign is to be implemented. In some implementations, the experiment subsystem 120 can cause the experiment campaign to be implemented by adjusting the control campaign so that the set of campaign parameters for the control campaign match the campaign parameters for the experiment campaign. In other implementations, the experiment subsystem 120 can cause the experiment campaign to be implemented by creating a new campaign having a set of campaign parameters that match the experiment parameters for the experiment campaign.

The set of campaign parameters can match the experiment parameters, for example, by having the same values as the experiment parameters. The set of campaign parameters can also match the experiment parameters by having values that are substantially the same. For example, keywords that are included in the set of campaign parameters can be synonyms, roots, extensions or other variants of the keywords in the experiment campaign. Additionally bids that are associated with the keywords in the set of campaign parameters can be within a threshold amount of the bids that are associated with the keywords in the experiment campaign. Further, experiment parameters that do not have corresponding parameters in the set of campaign parameters (e.g., experiment period and experiment name) can be omitted from the set of campaign parameters.

Once the experiment campaign has been implemented, it can serve as a new control campaign for other experiment campaigns. For example, an advertiser can specify new experiment parameters that are variations of the new control campaign in order to continue to identify campaign parameter variations that may increase the performance measures for the new control campaign.

Figure 3:
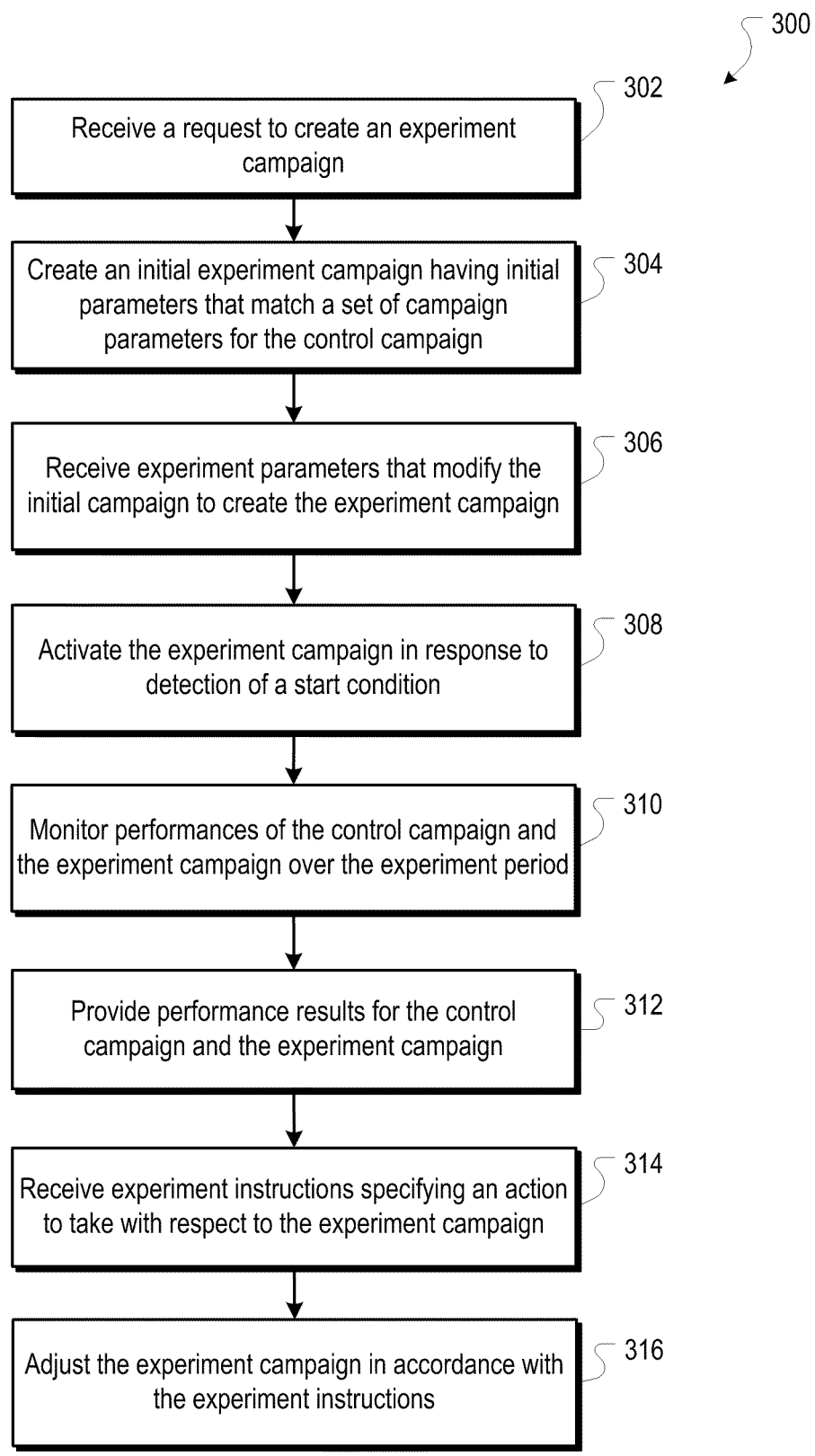
FIG. 3 is a flowchart of an example process for conducting an experiment campaign.

FIG. 3 is a flowchart of an example process 300 for conducting an experiment campaign. The process 300 is a process by which an initial experiment campaign is created using a set of campaign parameters for a control campaign in response to a request to configure an experiment campaign. A final experiment campaign is created based on experiment parameters that are received to modify the initial campaign. The final experiment campaign is implemented in response to detection of the start condition and performance of the control campaign and the experiment campaign are monitored over an experiment period. In turn, performance results for the control campaign and experiment campaign are provided and the experiment campaign is adjusted in accordance with received experiment instructions.

The process 300 is described below with reference to advertising campaigns that control distribution of advertisements in an online environment. However, the process 300 can also be used with other content distribution campaigns that control distribution of other content (e.g., video, audio, game, or other content).

The process 300 can be implemented, for example, by the experiment subsystem 120 and/or the advertisement management system of FIG. 1. In some implementations, the experiment subsystem 120 is a data processing apparatus that includes one or more processors that are configured to perform actions of the process 300. In other implementations, a computer readable medium can include instructions that, when executed by a computer, cause the computer to perform actions of the process 300.

A request is received to create an experiment campaign (302). In some implementations, the request to create an experiment campaign can be a request to create an experiment campaign that corresponds to a specified control campaign. The specified control campaign can be, for example, a campaign that has been previously created by, or for, the advertiser and is being used to control distribution of advertisements for the advertiser. In some implementations, the control campaign includes a set of campaign parameters that are used to control allocation of content (i.e., distribution of advertisements) for the advertiser. The advertiser's request can be received, for example, with data generated in response to the advertiser's selection of an experiment user interface element from a campaign management user interface as described above with reference to FIG. 2A.

An initial experiment campaign having initial experiment parameters that match a set of campaign parameters for the control campaign is created (304). In some implementations, the initial experiment campaign has initial experiment parameters that are the same as the campaign parameters that are included in the set of campaign parameters for the control campaign. For example, initial experiment campaign can have a same set of targeting keywords as the targeting keywords included in the set of campaign parameters for the control campaign. The initial experiment campaign can also have the same bids as the control campaign for each of the targeting keywords. Further, the initial campaign can include a same set of content as that distributed by the control campaign.

In other implementations, the initial experiment campaign can have initial experiment parameters that are not the same as the campaign parameters, but still match the campaign parameters. In these implementations, the initial experiment parameters can match the campaign parameters by having campaign parameters that satisfy a similarity threshold with respect to the campaign parameters. For example, the initial experiment campaign can have targeting keywords that match the targeting keywords included in the set of campaign parameters by including synonyms or other terms that are identified as relevant to the keywords (e.g., using clustering techniques) in the set of campaign parameters. Similarly, the initial experiment parameters can match the set of campaign parameters by having bids that are within a threshold amount of the bids included in the set of campaign parameters. For example, the initial experiment campaign can have bids that are 10% higher than the bids that are included in the set of campaign parameters and still match the bids for the set of campaign parameters. In some implementations, the initial experiment parameters can also match the set of campaign parameters when the initial experiment parameters include at least one fewer parameter than the set of campaign parameters.

Experiment parameters that modify the initial experiment campaign are received to create a final experiment campaign that corresponds to the control campaign (306). In some implementations, the experiment parameters are used to adjust at least one initial experiment parameter that matches the set of campaign parameters for the control campaign. For example, the experiment parameters can include data specifying that one or more targeting keywords for the control campaign not be included in the experiment campaign. Additionally, the experiment parameters can include data specifying that one or more of the bids corresponding to targeting keywords for the control campaign be adjusted for the experiment campaign.

The experiment parameters can also include data specifying additional targeting criteria and/or corresponding bids that can be used for determining whether content is provided by the experiment campaign in response to a contact request. For example, an advertiser can specify additional targeting criteria, such as targeting keywords, that are not included in, or otherwise differ from, existing targeting criteria for the control campaign, but can be used to provide content for the experiment campaign. Additionally, the experiment parameters can also include data specifying additional content that is not provided by the control campaign, but can be provided by the experiment campaign. For example, an advertiser can specify additional advertising creatives that can be provided by the experiment campaign in response to content requests.

The experiment parameters can further include data specifying an experiment period. As described above with reference to FIG. 2B, the experiment period can be defined by a start date and a stop date, and the experiment campaign can be available to provide content from the start date to the stop date. Additionally, the experiment period can also be defined by specified events (e.g., a start event and a stop event) or other start and stop conditions.

In some implementations, the experiment parameters also include data specifying a portion of content requests received during the experiment period for which the experiment campaign is available to provide content. For example, the experiment parameters can specify a percentage of total content requests received during the experiment period for which the experiment campaign can be used to provide content. Alternatively, the experiment parameters can specify an absolute number (e.g., 10,000) of content requests for which the experiment campaign can be used to provide content during the experiment period. The experiment parameters can also specify a time-based distribution for using the experiment campaign to provide content during the experiment period. For example, the experiment parameters can specify a normal distribution, a level distribution, or a distribution function by which the availability of the experiment campaign for providing content is determined.

As the experiment parameters are received, differences between the experiment campaign and the control campaign can be stored as "experiment difference data" in a data store and indexed, for example, based on the experiment campaign to which the experiment difference data corresponds. For example, in response to receiving experiment parameters specifying a new targeting keyword for the experiment campaign that is not included in the control campaign, data representing the new keyword can be stored in the data store as experiment difference data and indexed to the experiment campaign. Similarly, in response to receiving experiment parameters specifying a bid for the experiment campaign that is adjusted relative to a corresponding bid for the control campaign, data representing the adjustment of the corresponding bid can be stored as experiment difference data in the data store and indexed to the experiment campaign.

As experiment parameters continue to be received, additional experiment difference data representing the differences between the experiment campaign and the control campaign can be stored in the data store and indexed to the experiment campaign. Once all of the experiment parameters have been received, the experiment difference data that is indexed to the experiment campaign can represent all of the differences between the experiment campaign and the control campaign. Therefore, assuming that the experiment campaign and the control campaign have at least one parameter in common, the memory required to store the experiment difference data is smaller than the memory required to store all of the parameters for the experiment campaign since redundant data is not stored for the experiment campaign.

For example, assuming that the experiment campaign and control campaign both include a common keyword, there will be no differences between the data that represent this keyword in the experiment campaign and the control campaign. Thus, the data representing this common keyword that is stored in the set of campaign parameters for the control campaign can be used by the experiment campaign. Similarly, if the bids corresponding to this common keyword are the same for the experiment campaign and the control campaign, there will be no differences between the data representing this bid in the experiment campaign and the control campaign. Thus, the data representing this bid in the control campaign can be used by the experiment campaign.

The experiment campaign is activated in response to detection of a start condition (308). In some implementations, the start condition is a specified condition that, upon detection, causes the experiment campaign to be activated. Start conditions, as described above, can include the occurrence of a specified event, the arrival of a start date, and/or a user action requesting that the experiment be activated.

Activation of the experiment campaign causes the experiment campaign to be available to provide content in response to content requests. In some implementations, the availability of the experiment campaign to provide content in response to particular content requests is subject to and/or specified by the experiment parameters for the experiment campaign. For example, the experiment parameters can specify that the availability of the experiment campaign is limited to a specified portion of content requests that are received during the experiment period. As described above, the specified portion can be a specified percentage of content requests received during the experiment period or an absolute number of content requests for which the experiment campaign is available during the experiment period. When the experiment campaign has been made available for the specified portion or number of content requests, the experiment campaign can be made unavailable. Determining whether an experiment campaign is available to provide content in response to a particular content request is described in more detail with reference to FIG. 4.

The performances of the control campaign and the experiment campaign are monitored over the experiment period (310). In some implementations, the performance of each campaign can be monitored by determining a number of content requests for which each campaign was available to provide content during the experiment period, a number of times content corresponding to each campaign was provided during the experiment period, and a number of selections of content provided for each campaign during the experiment period. For example, a total number of impressions for content provided by each campaign and an aggregate number of impressions for content provided by both campaigns can be computed based on the number of times that content corresponding to each campaign was provided during the experiment period. Similarly, the total number of selections (i.e., total clicks) for content provided by both campaigns can be computed based on the number of selections of content provided for each campaign.

In some implementations, data representing each impression or selection of content corresponding to the experiment campaign or the control campaign can be stored with data identifying the campaign for which the content was provided and/or data identifying parameters of the corresponding campaign that caused presentation of the content. For example, if a particular advertisement is provided for the experiment campaign based on a content request including data that matches a particular targeting keyword for the experiment campaign, then data identifying the particular targeting keyword and/or data representing the price paid by the advertiser to provide the advertisement can be stored with data representing an impression for the advertisement. Additionally, if the advertisement is subsequently selected by a user, data representing the selection of the advertisement can also be stored with the data representing the impression, the data identifying the particular keyword, and/or the data representing the price paid by the advertiser. The data identifying the campaign for which the content is provided, the data identifying parameters of the campaign that caused presentation of the content, as well as the data representing the price paid by the advertiser can be used to compute delineated performance measures for different parameters of each campaign, as described with reference to FIG. 2D.

Performance results for the control campaign and the experiment campaign are provided (312). In some implementations, the performance results are provided by providing data that causes presentation of the performance results on a user device. As described with reference to FIG. 2D, the data provided to cause presentation of the performance measures can also cause presentation of variation identifiers that represent variations between performance measures for the control campaign and the experiment campaign.

Experiment instructions are received that specify an action to take with respect to the experiment campaign (314). In some implementations, the experiment instructions can include instructions requesting that the experiment campaign be stopped, implemented, and/or deleted. As described with reference to FIG. 2D, experiment instructions requesting that the experiment campaign be stopped, implemented, and/or deleted can be received in response to respective user selections of user interface elements that are provided to a user. For example, a user selection of a "stop" button can generate the experiment instructions that are received. Similarly, user selections of an "implement" button and a "delete" button can generate the experiment instructions that are received.

The experiment campaign is adjusted in accordance with the experiment instructions (316). For example, in response to receiving experiment instructions requesting that the experiment campaign be deleted, data representing the experiment campaign (e.g., experiment difference data) can be removed from a data store of available campaigns. Additionally, in response to receiving experiment instructions requesting that the experiment campaign be stopped, the experiment campaign can be made unavailable for providing content in response to additional content requests. Further, in response to receiving experiment instructions requesting that the experiment campaign be implemented, the experiment difference data can be used to adjust the set of campaign parameters to match the experiment parameters. In turn, the experiment campaign can also be deleted.

Once the experiment campaign has been adjusted in accordance with the experiment instructions, the process 300 can iteratively repeat. In some implementations, an advertiser can be limited to creating and/or activating a specified number (e.g., one) of experiment campaigns during the same experiment period and/or for a same control campaign. In other implementations, an advertiser can be enabled to create an unlimited number of experiment campaigns, such that multiple experiment campaigns can be active during a single campaign period or for a single control campaign.

When more than one experiment campaign is activated, the advertiser can specify the portion of content requests for which each of the campaigns will be available. In some implementations, one or more campaign parameters can be different for each experiment campaign relative to the control campaign and the other experiment campaigns. In these implementations, the performance measures for each of the experiments can be statistically analyzed to determine relationships between campaign parameters and campaign performance.

Figure 4:
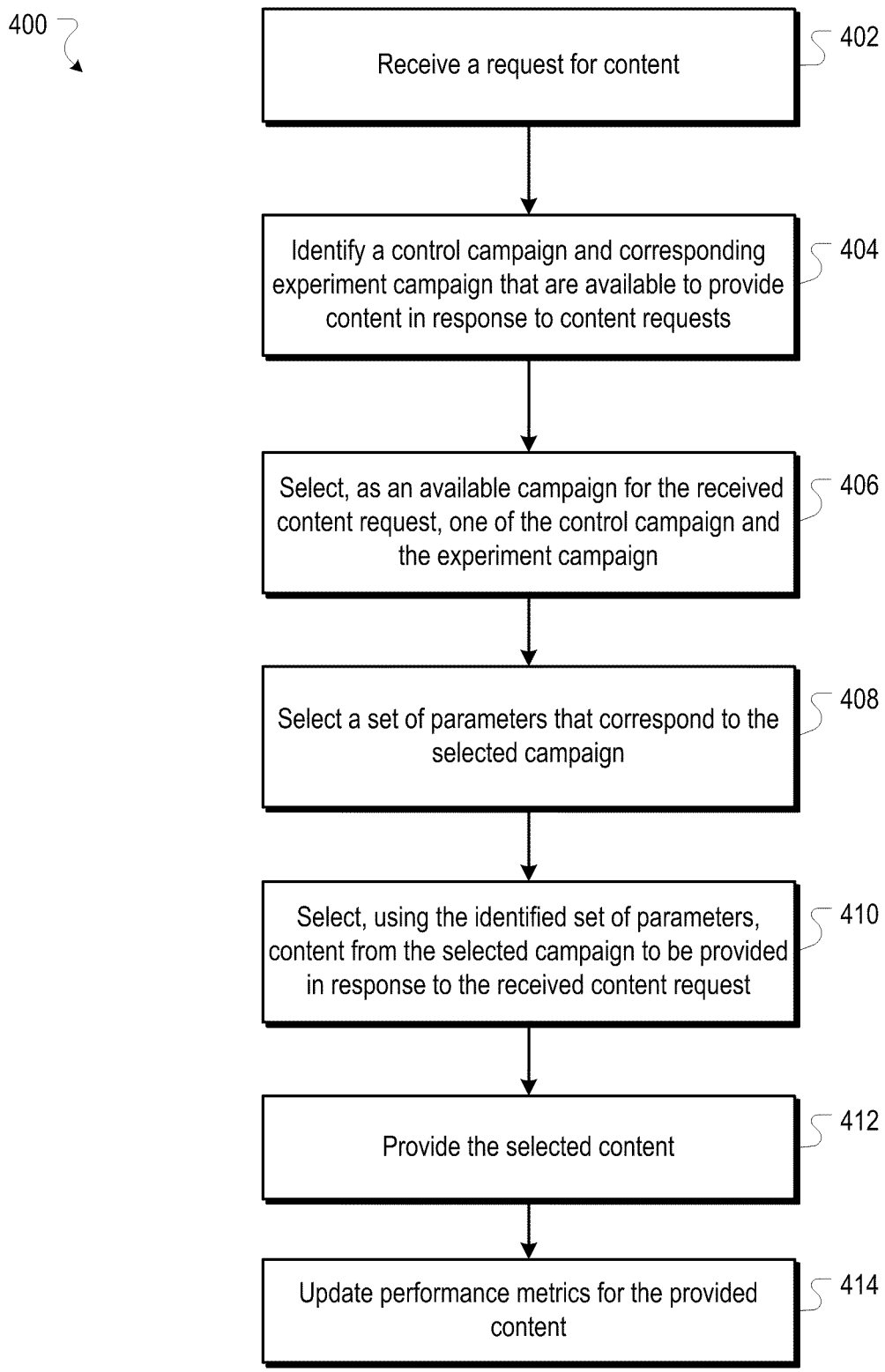
FIG. 4 is a flowchart of an example process for providing selected content and updating performance measures for the provided content.

FIG. 4 is a flowchart of an example process 400 for providing selected content and updating performance measures for the provided content. The process 400 is a process by which a content request is received and campaigns that are available to provide content in response to the content request are identified. When a control campaign and corresponding experiment campaign are both available campaigns to provide content in response to content requests, either the control campaign or the experiment campaign is selected as the available campaign for the received content request. Based on the selection, content is selected to be provided in response to the content request based on parameters corresponding to the selected campaign. In turn, the selected content is provided and performance measures for the provided content are updated.

The process 400 is described below with reference to advertising campaigns that control distribution of advertisements in an online environment. The process 400 can also be used with other content distribution campaigns that control distribution of other content (e.g., video, audio, game, or other content).

The process 400 can be implemented, for example, by the experiment subsystem 120 and/or the advertisement management system of FIG. 1. In some implementations, the experiment subsystem 120 is a data processing apparatus that includes one or more processors that are configured to perform actions of the process 400. In other implementations, a computer readable medium can include instructions that when executed by a computer cause the computer to perform actions of the process 400.

A request for content is received (402). In some implementations, the request for content ("content request") can be a request specifying one or more environment parameters corresponding to the environment for which the requested content is being requested. For example, a content request can include characteristics of a display environment in which the requested content will be presented. For example, the content request can include dimensions of a display environment in which the requested content will be presented and/or topics to which other content that will be presented with the requested content are relevant. The topics to which the other content are relevant can be represented, for example, by resource keywords, as described above.

The content request can also include characteristics corresponding to a user to whom the requested content will be presented and/or characteristics of a user device that will present the requested content. For example, geographic identifiers that identify a geographic location of a user device that will present the requested content can be included in the content request. Additionally language identifiers that represent a language setting for the user device that will present requested content can also be included in the content request. Further, a user profile for the user to whom the requested content will be presented can also be referenced by, or included with, the content request. The user profile can include data that specifies demographic and/or psychographic information corresponding to the user.

In response to receiving the content request, the control campaign and corresponding experiment campaign that are available to provide content in response to content requests are identified (404). In some implementations, the control campaign and corresponding experiment campaign are identified following identification of a content distribution account that is available to provide content in response to content requests. For example, in response to receiving the content request, content distribution accounts are activated to provide content in response to content requests can be identified. In turn, a determination can be made that the identified content distribution account includes a control campaign and corresponding experiment campaign that are both active.

For example, a data flag can be set for the content distribution account that identifies the account as having an available experiment campaign that corresponds to an available control campaign. Upon detection of the data flag, the content distribution account is identified as having a control campaign and corresponding experiment campaign. The determination that a control campaign has a corresponding experiment campaign can also be made based on data stored in association with the control campaign. For example, a data flag can be set for the control campaign when the experiment campaign is activated.

Identification of a control campaign and corresponding experiment campaign based on a data flag is provided for purposes of example only. There are other ways that an available experiment campaign that corresponds to an available control campaign can be identified. For example, an index of available experiment campaigns and their corresponding available control campaigns can be maintained to facilitate identification of these campaigns.

One of the control campaign and the experiment campaign are selected as an available campaign for the received content request (406). In some implementations, only one of the control campaign or the experiment campaign can be available to provide content in response to a single content request. In these implementations, in response to receiving the content request, either the control campaign can be made available to provide content in response to the content request or the experiment campaign can be made available to provide content in response to the content request.

The selection of the experiment campaign or the control campaign can be made based on the specified portion of content requests during the experiment period for which the experiment campaign is available to provide content. In some implementations, the selection can be a probability constrained selection between the control campaign and the experiment campaign. For example, the probability constraints for the selection can specify that the experiment campaign is selected with a probability corresponding to the specified portion of content requests for which the experiment campaign is available to provide content. Similarly, the probability constraints for the selection can specify that the control campaign is selected with a probability corresponding to the specified portion of content requests for which the control campaign is available to provide content. As described with reference to FIG. 2B, an advertiser (or other account administrator) can specify the portions of content request for which each of the campaigns is to be available.

In some implementations, the probability constrained selection is a pseudorandom selection between the experiment campaign and the control campaign, where the pseudorandom selection is probability constrained. For example, each of the control campaign and the experiment campaign can be assigned a set of integers between 1-100, where the set of integers assigned to each of the campaign corresponds to the portion of content requests for which the respective campaign is available. For this example, assume that the experiment campaign is available for 30% of the content requests and assigned the integers 1-30, while the control campaign is available for 70% of the content requests and assigned integers 31-100. In response to receiving a particular content request, a pseudorandom number generator can generate an integer between 1-100. If the integer is between 1-30, the experiment campaign is made available for that particular content request, whereas if the integer is between 31-100, the control campaign is made available for the particular content request. This process can continue for each content request received during the experiment period to select the experiment campaign as the available campaign for 30% of the content requests, while selecting the control campaign as the available campaign for 70% of the content requests.

In some implementations, the selection of the experiment campaign or the control campaign can be made based on environment parameters that are specified by the content request. In these implementations, an advertiser can specify that the experiment campaign be selected as the available campaign for content requests that specify one or more particular environment parameters, while the control campaign be selected as the available campaign for all other content requests that do not include the particular environment parameters.

For example, an advertiser can specify that the experiment campaign be selected as the available campaign for content requests corresponding to user devices in a particular geographic area and/or include a reference to a particular identifier (e.g., cookie). In this example, the experiment campaign will be selected as the available campaign for content requests that are identified as corresponding to user devices in the particular geographic area and/or include the reference to the particular identifier, and the control campaign can be selected as the available campaign for all other content requests. Alternatively, the advertiser can specify that the control campaign be selected as the available campaign for content requests corresponding to user devices in another geographic area (i.e., different from the particular geographic area specified for the experiment campaign).

Example processes for selecting an available campaign for a particular content request are provided, but other methods can be used. For example, a schedule can be generated specifying which campaign will be made available in response to each sequentially received content request. Additionally, other environmental parameters or other data (e.g., time data) can be used to select which campaign will be available for each particular content request. For example, the time at which the content request is received can be used to select the experiment campaign (e.g., selected on even seconds) or the control campaign (e.g., selected on odd seconds). Other pseudorandom selection methods can also be used.

Once the available campaign has been selected for a particular content request, a set of parameters that correspond to the selected campaign are selected (408). In some implementations, the control campaign has a corresponding set of campaign parameters that control allocation of content for the control campaign. When the control campaign is selected as the available campaign, the set of campaign criteria corresponding to the control campaign can be made available and/or selected to control allocation of content for the control campaign. When the experiment campaign is selected as the available campaign, the set of campaign parameters for the corresponding control campaign as well as the experiment difference data corresponding to the experiment campaign can be made available and/or selected to control allocation of content for the experiment campaign.

As described above, the set of campaign parameters can include targeting criteria that selectively provide content for the control campaign in response to content requests. For example, the set of campaign parameters can be used to determine whether content for the control campaign is to be provided based on whether the targeting parameters for the campaign match the environment parameters for the content request. If a targeting keyword for the campaign matches a resource keyword included in the content request, content corresponding to the targeting keyword can be provided in response to the content request. Similarly, demographic and/or psychographic targeting criteria can be compared to demographic and/or psychographic information that is specified by the environment parameters, and content for the campaign can be provided when the demographic or psychographic information and targeting criteria match.

Also described above, the experiment campaign is represented by the set of campaign parameters for the control campaign and the experiment difference data corresponding to the experiment campaign. For example, the experiment difference data can include data representing the differences between the experiment campaign and the control campaign. Therefore, the experiment difference data alone may not provide sufficient data to accurately control allocation of content for the experiment campaign. For example, when the experiment campaign has a same targeting keyword as the control campaign, the experiment difference data will not include data representing the targeting keyword. Therefore, if only the content difference data were used to control allocation of content for the experiment campaign, the content may not be provided in response to a content request including environment parameters that match that targeting keyword. However, using the set of campaign parameters and the experiment difference data can enable the content to be provided in this example because the set of campaign parameters will include data representing the targeting keyword.

Content is selected in response to the received content request using the identified set of parameters (410). In some implementations, the selected content is content corresponding to one or more targeting criteria that match the environment parameters corresponding to the content request. The content can be one of a plurality of advertisement creatives that are available to be provided in response to particular targeting criteria for the campaign being matched. For example, in response to receiving a content request including environment parameters that match a targeting keyword having two different advertisement creatives that can be provided, one of the advertisement creatives can be selected to be provided. The selection of the advertisement creative can be based, for example, on a measure of the match between the environment parameters and the targeting keyword (e.g., exact terms or relevant terms) or a specified creative rotation schedule that specifies a presentation schedule for the creatives.

The selected content is provided (412). In some implementations, the selected content is provided to a user device from which the content request was received or from which the content request originated. In other implementations, the selected content is provided to a user device identified in the content request. For example, the content request can include an Internet Protocol address or other network address that identifies the user device to which the selected content is to be provided.

Performance measures for the provided content are updated (414). In some implementations, the performance measures are updated each time that content is provided in response to a content request. In other implementations, the performance measures can be periodically updated to reflect monitored performance since the last update. The performance measures that are updated can include, for example, a number of times that the content was provided in response to content requests and a number of times that the content was selected by a user in response to being provided. In some implementations, data representing the updated performance measures can be provided to a user device to cause presentation of the updated performance measures on a presentation device connected to, or integrated with, the user device.

Figure 5:
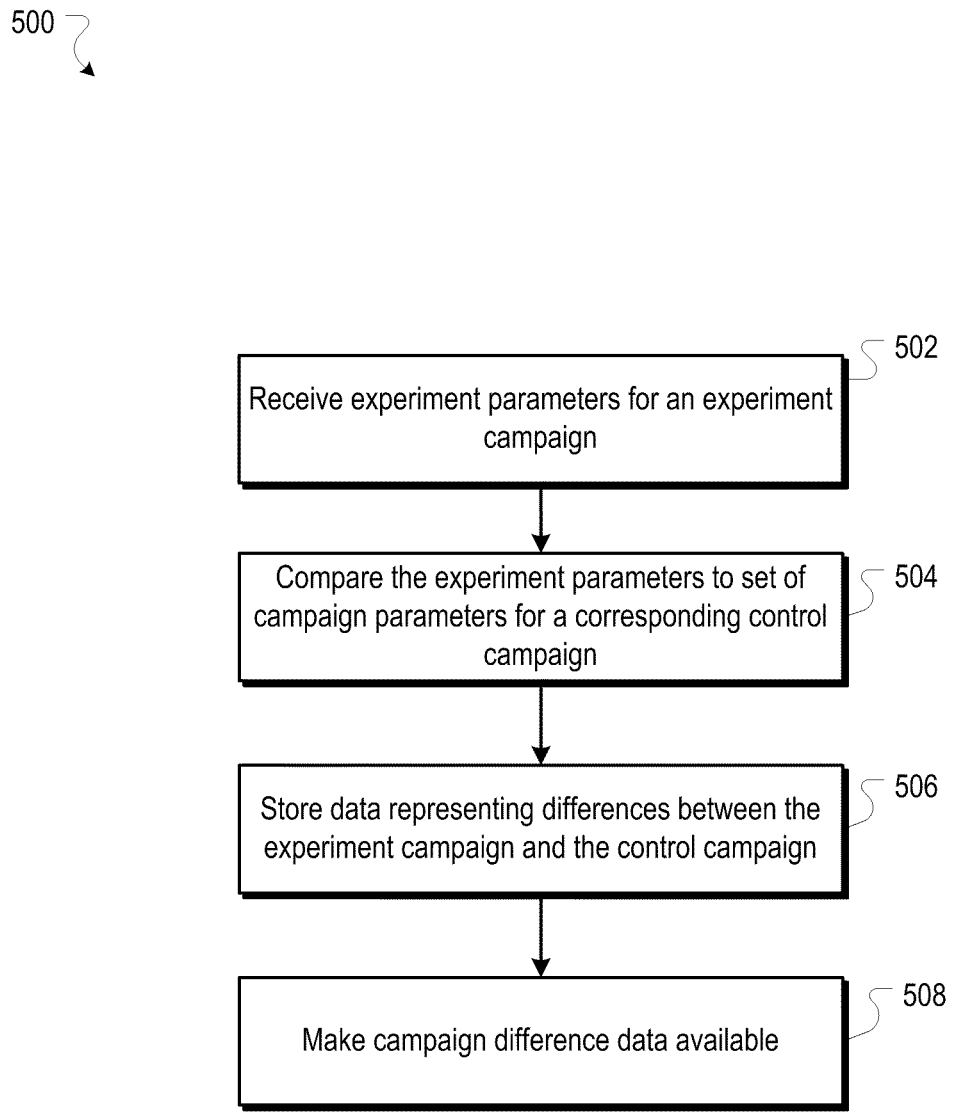
FIG. 5 is a flowchart of an example process for generating experiment difference data.

FIG. 5 is a flowchart of an example process 500 for generating experiment difference data. The process 500 is a process by which experiment difference data that represent differences between an experiment campaign and a control campaign are generated and made available.

The process 500 can be implemented, for example, by the experiment subsystem 120 and/or the advertisement management system of FIG. 1. In some implementations, the experiment subsystem 120 is a data processing apparatus that includes one or more processors that are configured to perform actions of the process 500. In other implementations, a computer readable medium can include instructions that when executed by a computer cause the computer to perform actions of the process 500.

Experiment parameters for an experiment campaign are received (502). In some implementations, experiment parameters can be received in response to a user adjusting initial experiment parameters that correspond to a set of campaign parameters for a control campaign. For example, when the set of campaign parameters for a control campaign are used as the initial experiment parameters, an experiment parameter can be received in response to a user adjusting a bid associated with a targeting keyword that is included in the control campaign. In other implementations, experiment parameters can be received in response to user submission of a new experiment parameter that was not included in the initial experiment parameters. For example, in these implementations, the experiment parameter can be received in response to a user specifying, for the experiment campaign, a new targeting keyword that was not included in the set of campaign parameters for the control campaign.

The experiment parameters are compared to the set of campaign parameters for the corresponding control campaign (504). For example, when the experiment parameter is received in response to adjustment of a parameter that was included in the set of campaign parameters for the control campaign, the difference between the experiment parameter and the corresponding campaign parameter can be determined. When an experiment parameter is received that was not included in the set of campaign parameters, the set of campaign parameters can be analyzed to ensure that the experiment parameter is not included in the set of campaign parameters.

The determination that an experiment parameter is not included in (or differs from) the set of campaign parameters can be made, for example, by determining whether data representing the experiment parameter matches data in the set of campaign parameters. For example, data representing a targeting keyword (and/or corresponding bid) that is received for the experiment campaign can be compared to data representing targeting keywords (and/or corresponding bids) for the control campaign. If the data representing the targeting keyword (and/or corresponding bid) for the experiment campaign matches data representing targeting keywords (and/or corresponding bids) for the control campaign, no experiment difference data corresponding to the targeting keyword is stored. If the data representing the targeting keyword for the experiment campaign does not match data representing the targeting keyword for the control campaign (e.g., the targeting keyword for the experiment campaign includes additional or different characters), the data representing the targeting keyword for the experiment campaign can be stored as experiment difference data.

Data representing differences between the experiment campaign and the control campaign ("experiment difference data") are stored (506). In some implementations, experiment difference data can be stored as a vector of values, with each value component in the vector corresponding to an experiment parameter that was determined to be different from the set of campaign parameters. For example, the vector can include data representing each additional keyword that has been received for the experiment campaign and/or differing bids for targeting keywords that are included in both campaigns. The experiment difference data can also include, for example, data representing differences in other targeting criteria (e.g., demographic, geographic, and/or psychographic) that have been specified for the experiment and control campaigns. The experiment difference data can also include data representing different advertising creatives that are available to be provided for the experiment and control campaigns.

The experiment difference data is made available (508). In some implementations, the experiment difference data is made available in response to a content request for which the experiment campaign is selected as the available campaign. For example, if the probability constrained selection of an experiment campaign or a control campaign results in the experiment campaign being selected as the available campaign for a particular content request, the experiment difference data can be made available. In these implementations, the set of campaign data corresponding to the control campaign can also be made available in response to the content request. In turn, the set of campaign data together with the experiment difference data can be used to select content to be provided in response to the content request.

In some implementations, the experiment difference data can be prevented from being made available or otherwise made unavailable when the control campaign is selected as the available campaign for a particular content request. Making the experiment difference data unavailable in these situations causes selection of content to be provided in response to the content request to be performed using the set of campaign parameters, but not the experiment difference data.

Figure 6:
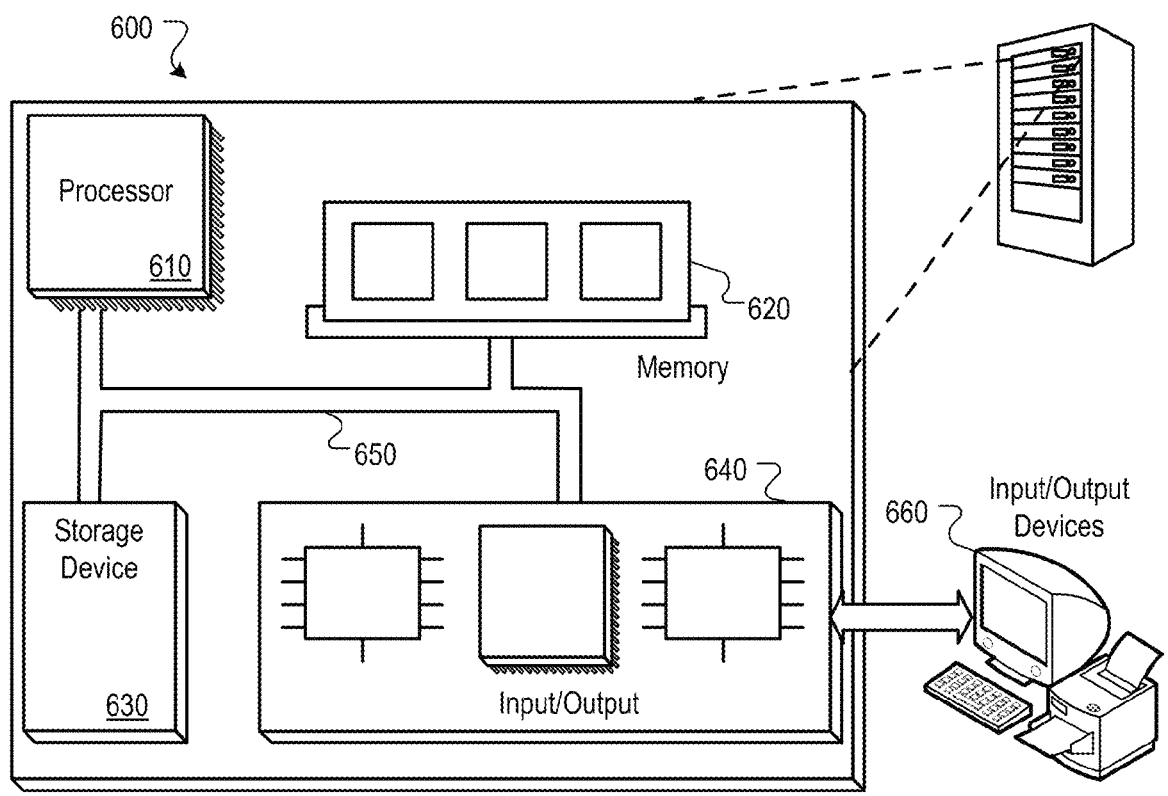
FIG. 6 is block diagram of an example computer system that can be used to create experiment campaigns and allocate content in response to resource requests.

FIG. 6 is block diagram of an example computer system 600 that can be used to create experiment campaigns and allocate content in response to resource requests. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600.

In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, or some other large capacity storage device.

The input/output device 640 provides input/output operations for the system 600. In one implementation, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

The experiment subsystem 120 and/or advertisement management system 110 can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The experiment subsystem 120 and/or advertisement management system 110 can be distributively implemented over a network, such as a server farm, or can be implemented in a single computer device.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving, by a data processing apparatus, a content request, the request specifying one or more environment parameters corresponding to the environment for which the requested content is being requested;
identifying, by a data processing apparatus and based on the environment parameters, a content distribution account for which a control campaign is eligible to provide a content item in response to the request, the content distribution account also including an experiment campaign;
selecting, by a data processing apparatus and as an available campaign for the received content request, the experiment campaign from among the control campaign and the experiment campaign, the selection being based on a portion of content item requests for which the experiment campaign is required to be selected;
identifying, for the control campaign, a set of campaign parameters that control distribution of content in the control campaign;
identifying, for the experiment campaign, experiment difference data specifying differences between the set of campaign parameters and experiment parameters for the experiment campaign, the experiment parameters being parameters that control distribution of content in the experiment campaign, and the experiment difference data excluding one or more of the experiment parameters that match a campaign parameter in the set of campaign parameters;
determining the experiment parameters based on a combination of the set of campaign parameters and the experiment difference data; and
providing, by a data processing apparatus, content from the experiment campaign in response to the request, the content being provided according to the experiment parameters.

2. The method of claim 1, further comprising:
updating, by a data processing apparatus, performance measures for the available campaign corresponding to the provided content, the performance measures including a total number of presentations of the content and a total number of user selections of the content; and providing, by a data processing apparatus, data that causes the updated performance measures to be presented on a presentation device.

3. The method of claim 2, wherein providing data that causes the updated performance measures to be presented comprises providing data that causes a total keyword performance to be provided for each keyword corresponding to the experiment campaign and the corresponding control campaign.

4. The method of claim 2, wherein providing data that causes the updated performance measures to be presented comprises providing data that causes presentation of delineated performance measures for at least one specified delineation of the experiment and control campaigns.

5. The method of claim 2, wherein providing data that causes the updated performance measures to be presented comprises providing data that causes presentation of an updated experiment performance at a presentation location that is adjacent to an updated control performance.

6. The method of claim 1, wherein only one of the experiment campaign and the control campaign is selected as the available campaign in response to a single content request.

7. The method of claim 1, wherein both the experiment campaign and the control campaign are available for selection as the available campaign in response to each content request.

8. The method of claim 1, further comprising:
in response to selecting the control campaign as the available campaign, selecting content to be provided in response to the request, the content being selected based on the set of campaign parameters.

9. The method of claim 1, further comprising:
in response to selecting the experiment campaign as the available campaign, selecting content to be provided in response the request, the content being selected based on the set of campaign parameters and the experiment difference data.

10. The method of claim 1, further comprising receiving a budget that specifies an amount that an advertiser is willing to pay for distribution of content over a specified budget period, wherein the budget is allocated to the experiment campaign in proportion to a portion of a total number of requests that are both received during an experiment period and in response to which the experiment campaign is available to provide content.

11. A system, comprising:
a data store storing a set of campaign parameters for a control campaign and experiment difference data for a corresponding experiment campaign, the experiment difference data being data specifying differences between experiment parameters for the experiment campaign and the set of campaign parameters for the control campaign, the experiment parameters being parameters that control distribution of content in the experiment campaign, and the experiment difference data excluding one of more of the experiment parameters that match a campaign parameter in the set of campaign parameters; and
an experiment subsystem coupled to the data store, the experiment subsystem comprising at least one processor configured to:
select, from among the control campaign and the experiment campaign and as an available campaign for a content request received during an experiment period, the experiment campaign;

determine, in response to selecting the experiment campaign as the available campaign, the experiment parameters based on a combination of the set of campaign parameters and the experiment difference data; and provide content from the experiment campaign according to the experiment parameters.

12. The system of claim 11, wherein the experiment subsystem is further configured to receive a content request specifying one or more environment parameters corresponding to the environment for which the requested content is being requested and provide content in response to the request, the provided content being content corresponding to the selected available campaign.

13. The system of claim 11, wherein the experiment subsystem is further configured to update performance measures for the available campaign corresponding to the provided content, the performance measures including a total number of presentations of the content and a total number of user selections of the content, and provide data that causes the updated performance measures to be presented on a presentation device.

14. The system of claim 12, wherein the experiment subsystem is further configured to provide data that causes a total keyword performance to be provided for each keyword corresponding to the experiment campaign and the control campaign.

15. The system of claim 12, wherein the experiment subsystem is further configured to provide data that causes presentation of delineated performance measures for at least one specified delineation of the experiment and control campaigns.

16. The system of claim 12, wherein the experiment subsystem is further configured to provide data that causes presentation of an updated experiment performance at a presentation location that is adjacent to an updated control performance.

17. The system of claim 11, wherein the experiment subsystem is further configured to select only one of the experiment campaign and the control campaign, as the available campaign, in response to a single content request.

18. The system of claim 11, wherein the experiment subsystem is further configured to select content to be provided in response to the request, the content being selected based on the set of campaign parameters corresponding to the control campaign when the control campaign is selected as the available campaign for the received content request.

19. The system of claim 11, wherein the experiment subsystem is further configured to select content to be provided in response to the request, the content being selected based on the set of campaign parameters and the experiment difference data when the experiment campaign is selected as the available campaign for the received content request.

20. The system of claim 11, further comprising a user device configured to receive data that causes presentation of updated performance measures that have been generated by the experiment subsystem.

21. A non-transitory computer storage medium encoded with a computer program, the program comprising instructions that when executed by data processing apparatus cause the data processing apparatus to perform operations comprising:
receiving a content request, the request specifying one or more environment parameters corresponding to the environment for which the requested content is being requested;

identifying, based on the environment parameters, a content distribution account for which a control campaign is eligible to provide a content item in response to the request, the content distribution account also including an experiment campaign;

selecting, by a data processing apparatus and as an available campaign for the received content request, the experiment campaign from among the control campaign and the experiment campaign, the selection being based on a portion of content item requests for which the experiment campaign is required to be selected;

identifying, for the control campaign, a set of campaign parameters that control distribution of content in the control campaign;

identifying, for the experiment campaign, experiment difference data specifying differences between the set of campaign parameters and experiment parameters for the experiment campaign, the experiment parameters being parameters that control distribution of content in the experiment campaign, and the experiment difference data excluding one or more of the experiment parameters that match a campaign parameter in the set of campaign parameters;

determining the experiment parameters based on a combination of the set of campaign parameters and the experiment difference data; and providing content from the experiment campaign in response to the request, the content being provided according to the experiment parameters.

* * * * *

UNITED STATES PATENT AND TRADEMARK OFFICE
CERTIFICATE OF CORRECTION

PATENT NO. : 8,539,067 B2  
APPLICATION NO. : 12/777554  
DATED : September 17, 2013  
INVENTOR(S) : Adam I. Juda et al.

Page 1 of 1

It is certified that error appears in the above-identified patent and that said Letters Patent is hereby corrected as shown below:

Title Page

Item (56) Other Publications – delete "Athina" and insert -- Athens --, therefor.

In the Claims

Claim 11, Column 35, Line 58 – delete "of" and insert -- or --, therefor.

Signed and Sealed this
Twenty-fourth Day of December, 2013

Margaret A. Focarino
*Commissioner for Patents of the United States Patent and Trademark Office*